United States Patent

Inaba et al.

[11] Patent Number: 5,804,283
[45] Date of Patent: Sep. 8, 1998

[54] MAGNETIC RECORDING MEDIUM

[75] Inventors: Hiroo Inaba; Masaki Suzuki; Naoto Abe; Toshiyuki Kitahara; Satoshi Matsubaguchi; Hiroaki Takano, all of Kanagawa, Japan

[73] Assignee: Fuji Photo Film Co., Ltd., Kanagawa, Japan

[21] Appl. No.: 968,860

[22] Filed: Nov. 5, 1997

Related U.S. Application Data

[63] Continuation of Ser. No. 499,398, Jul. 7, 1995, abandoned.

[30] Foreign Application Priority Data

| Jul. 8, 1994 | [JP] | Japan | 6-157668 |
| Jul. 8, 1994 | [JP] | Japan | 6-179704 |

[51] Int. Cl.$^6$ .................................................. G11B 5/68
[52] U.S. Cl. .......................... 428/141; 428/212; 428/216; 428/336; 428/425.9; 428/694 BS; 428/694 BA; 428/900
[58] Field of Search ...................... 428/141, 212, 428/216, 425.9, 694 BS, 336, 900, 694 BA

[56] References Cited

U.S. PATENT DOCUMENTS

| 5,196,265 | 3/1993 | Ryoke et al. | 428/332 |
| 5,405,679 | 4/1995 | Isobe | 428/212 |
| 5,458,948 | 10/1995 | Yanagita et al. | 428/141 |
| 5,489,466 | 2/1996 | Inaba et al. | 428/212 |

*Primary Examiner*—Stevan A. Resan
*Attorney, Agent, or Firm*—Sughrue, Mion, Zinn, Macpeak & Seas, PLLC

[57] ABSTRACT

A magnetic recording medium prepared by a process which comprises providing a nonmagnetic layer comprising a nonmagnetic powder and a binder on a nonmagnetic support, and then providing one or more magnetic layers containing at least a ferromagnetic powder and a binder on the nonmagnetic layer while the nonmagnetic layer is wet, wherein the thickness of the magnetic layer is from 0.07 to 0.20 μm, the magnetic layer comprises a resin curable by a polyisocyanate as a binder, the nonmagnetic layer is a layer cured by a polyisocyanate, and the ratio N/Fe in the magnetic layer is from 0.010 to 0.090 as determined by an X-ray photoelectric spectrophotometer; and a magnetic recording medium comprising a nonmagnetic support having thereon a lower nonmagnetic layer comprising a nonmagnetic powder and a binder, and further thereon a magnetic layer comprising at least a ferromagnetic metal powder and a binder, wherein the magnetic layer has a thickness of from 0.07 to 0.20 μm, the magnetic layer has a maximum magnetic flux density Bm of from 3,700 to 6,000 G as measured in an external magnetic field of 10 kOe, the magnetic layer has a coercive force Hc of from 2,000 to 3,000 Oe, the magnetic layer has a center line surface roughness Ra of from 1.0 to 3.0 nm, and the nonmagnetic support has a center line surface roughness of from 0.5 to 7.0 nm on the side thereof to which the lower non layer is provided.

12 Claims, No Drawings

MAGNETIC RECORDING MEDIUM

This is a Continuation of application Ser. No. 08/499,398 filed Jul. 7, 1995 abandoned.

FIELD OF THE INVENTION

The present invention relates to a magnetic recording medium. More particularly, the present invention relates to a magnetic recording medium which provides recording and reproduction of a digital signal at a high density. Further, the present invention relates to a coating type magnetic recording medium which exhibits a high output and C/N ratio at high frequencies; a sufficient output and a high overwriting erasability at low frequencies; an excellent compatibility with a vacuum-evaporated magnetic tape.

BACKGROUND OF THE INVENTION

Magnetic recording media are widely used as audio recording tape, video recording tape, computer tape, and disc, etc. The recording density of magnetic recording media have become higher, and their recordable wavelength has become shorter every year.

As the recording system for such magnetic recording media there have been studied analog system as well as digital system. In order to meet the requirement for high density recording, a magnetic recording medium comprising a thin metal film as a magnetic layer has been proposed. From the standpoint of productivity and practical reliability such as corrosion resistance, a so-called coating type magnetic recording medium comprising a dispersion of a ferromagnetic powder in a binder coated on a support is advantageous. However, the coating type magnetic recording medium has a low percent filling of magnetic material as compared to the thin metal film and thus exhibits poor electromagnetic characteristics inferior to those of the thin metal film.

As such a coating type magnetic recording medium there has been widely used one comprising a nonmagnetic support having coated thereon a magnetic layer comprising a ferromagnetic iron oxide powder, Co-modified ferromagnetic iron oxide powder, $CrO_2$ powder, ferromagnetic alloy powder, etc. dispersed in a binder.

In order to enhance the electromagnetic characteristics of the coating type magnetic recording medium, various approaches such as improvement of magnetic properties of the ferromagnetic powder and smoothening of the surface thereof have been proposed. However, these approaches are not adequate for the purpose of enhancing the recording density. The recent years have shown a tendency that as the recording density of the magnetic recording media becomes higher, the recordable wavelength thereof becomes shorter. Therefore, if the thickness of the magnetic layer is great, the output drop due to self-demagnetization during recording or thickness loss during reproduction becomes remarkable. In order to solve these problems, an extremely thin coating type magnetic recording medium has been proposed.

In recent years, a tape on which a thin metal film has been formed by vacuum evaporation, i.e., so-called ME (metal evaporated) tapes, have been put into practical use in the field of Hi-8 VCR and consumer digital VCR (hereinafter referred to as "DVC"). Accordingly, a system in which an alloy powder-coated tape, i.e., so-called MP (metal particulate) tape and an ME tape can be used compatibly with each other has been put into practical use.

In order that MP tapes are made compatible with ME tapes, they must have a thin magnetic layer for higher output as well as have a smooth sliding movement relative to the head similarly to ME tapes. In particular, ME tapes have a thin metal film and thus exhibit a poor flexibility. Therefore, the shape of the head needs to be closely adjusted. Accordingly, the tolerance of MP tapes for the shape of the head must be improved. MP tapes thus have been desired which have an ME compatibility high enough to provide similar electromagnetic characteristics even when the two different kinds of tapes are frequently exchanged with each other.

DVC employs a system in which a 0.5-$\mu$m recording wavelength data signal is overwritten on a 22-$\mu$m recording wavelength tracking signal so that recording is effected while erasing the tracking signal. That is, DVC omits an erasing head to reduce the weight thereof and employs the overwriting erasure system. In order to employ the overwriting erasure system, it is necessary that the synchronizing signal be erased by a data signal. Therefore, the data signal must be provided at a high output. The overwriting erasure is preferably not greater than −20 dB.

A magnetic recording medium is desired to have as low overwriting erasability as possible. The thinner the magnetic layer is, the better is the overwritability. However, when the thickness of the magnetic layer is simply reduced, the total magnetization is reduced, causing a reduction in the reproduced output of a long wavelength signal such as synchronizing signal. Thus, the overwritability and the output of a long wavelength signal are contrary to each other. That is, the satisfaction of the overwritability by the rise in erasability and the approach for securing desired output of various signals are antinomic. No methods for satisfying the two requirements have been found.

The present inventors have proposed an extremely thin magnetic recording medium comprising a nonmagnetic layer as a lower layer and a thin magnetic layer formed thereon. For example, JP-A-63-187418 (The term "JP-A" as used herein means an "unexamined published Japanese patent application") discloses a magnetic recording medium prepared by applying a dispersion of a ferromagnetic powder having an average major axis length of less than 0.3 $\mu$m and a crystalline size of less than 300 Å to a nonmagnetic layer. JP-A-63-191315 discloses a magnetic recording medium comprising a lower layer comprising a thermoplastic resin having a thickness of not less than 0.5 $\mu$m and a magnetic layer comprising a thermosetting resin having a thickness of 1 $\mu$m formed thereon. However, these do not disclose essential points satisfying the overwriting erasability in question. Thus, a magnetic recording medium which exhibits a head contact compatible with ME tapes cannot be provided.

JP-A-2-108233 discloses a magnetic recording medium prepared by applying a first magnetic layer to a nonmagnetic support, and then applying a second magnetic layer to the first magnetic layer, in that the content of a polyisocyanate in the first magnetic layer and the second magnetic layer are defined with respect to the amount of the magnetic material, and the content of the polyisocyanate in the first magnetic layer is greater than that of the second magnetic layer, to improve the head contact and hence provide excellent electromagnetic characteristics and a prolonged durability at the same time. However, this proposal has been found disadvantageous in that since the thickness of the second magnetic layer is as great as from 0.3 to 1.5 $\mu$m, the simple application of this technique to the foregoing conventional thin magnetic layer cannot realize the improvement in the compatibility with ME tapes in head contact as mentioned above.

Further, JP-A-5-298653 proposes that the thickness of the magnetic layer is reduced to less than 0.3 μm and the standard deviation of thicknesses is controlled to a predetermined range to provide a magnetic recording medium having an excellent overwritability (capability of a 1.9-MHz signal being overwritten by a 7.6-MHz signal) and a less strain during digital recording.

JP-A-5-73883 discloses that the thickness of the magnetic layer is controlled to not more than 1 μm and the variation of the thickness of the magnetic layer is controlled to a predetermined range to reduce the self-demagnetization loss in the short wavelength range and provide a smooth magnetic layer that can eliminate spacing loss, making it possible to provide an MP tape which is enough compatible with ME tapes to give a high output from a low range to a high range. This also proposes that a magnetic recording medium can be proposed which exhibits a good head contact, an excellent storage stability, an excellent running durability, and a less dropout, block error rate and edge damage.

JP-A-5-28464 discloses a magnetic recording medium comprising a nonmagnetic layer composed only of a binder and semisolid or liquid additives and a magnetic layer having a thickness of not more than 1 μm. This proposes that this magnetic recording medium is insusceptible to surface roughening and provides improvements in waveform response, overwritability (capability of a 10-MHz signal being overwritten by a 20-MHz signal) and output at 40 MHz.

However, these prior art techniques leave something to be desired in the improvement of overwritability and the provision of low range output. In particular, no satisfactory results can be provided with the overwritability in the 24-25 modulation code employed in DVC.

Further, these prior art techniques leave something to be desired in the foregoing compatibility with ME tapes. It has been thus desired to provide a magnetic recording medium having a satisfactory compatibility.

SUMMARY OF THE INVENTION

An object of the present invention to provide a magnetic recording medium having excellent electromagnetic characteristics and more particularly a magnetic recording medium which gives a high reproduced output and exhibits a good head contact when used as a substitute for ME tape such as Hi-8 video tape and DVC tape.

Another object of the present invention to provide a magnetic recording medium having excellent electromagnetic characteristics and more particularly a magnetic recording medium which exhibits an improved overwritability and gives a high output at lower range and almost the same optimum recording current as ME tape does to provide a good compatibility with ME tape.

These and other objects and effects of the present invention will become more apparent from the following detailed description and examples.

The present invention relates to, as a first aspect, a magnetic recording medium prepared by a process which comprises providing a nonmagnetic layer comprising a nonmagnetic powder and a binder on a nonmagnetic support, and then providing one or more magnetic layers containing at least a ferromagnetic powder and a binder on the nonmagnetic layer while the nonmagnetic layer is wet, wherein the thickness of the magnetic layer is from 0.07 to 0.20 μm, the magnetic layer comprises a resin curable by a polyisocyanate as a binder, the nonmagnetic layer is a layer cured by a polyisocyanate, and the ratio N/Fe in the magnetic layer is from 0.010 to 0.090 as determined by an X-ray photoelectric spectrophotometer.

The present invention also relates to, as a second aspect, a magnetic recording medium comprising a nonmagnetic support having thereon a lower nonmagnetic layer comprising a nonmagnetic powder and a binder, and further thereon a magnetic layer comprising at least a ferromagnetic metal powder and a binder, wherein the magnetic layer has a thickness of from 0.07 to 0.20 μm, the magnetic layer has a maximum magnetic flux density Bm of from 3,700 to 6,000 G as measured in an external magnetic field of 10 kOe, the magnetic layer has a coercive force Hc of from 2,000 to 3,000 Oe, the magnetic layer has a center line surface roughness Ra of from 1.0 to 3.0 nm, and the nonmagnetic support has a center line surface roughness of from 0.5 to 7.0 nm on the side thereof to which the lower nonmagnetic layer is provided.

DETAILED DESCRIPTION OF THE INVENTION

The first aspect of the present invention will be further described hereinafter.

It can be presumed that the first aspect of the present invention can be accomplished by the mechanism comprising the following constituent elements:

Since ME tape exhibits a high stiffness on the surface of the magnetic layer, the head needs to be always rough to allow ME tape to have a smooth sliding movement relative to the head. Since the conventional MP tape is entirely soft, and a low molecular polyisocyanate oozes out to the vicinity of the surface layer when the tape is dry, the surface of the magnetic layer is considered somewhat hard and is liable to smoothen the head. Once the head has been smoothened, ME tape, which has a high stiffness, cannot make a smooth contact with the head.

The first aspect of the present invention eliminates the foregoing difficulties. That is, the surface of the magnetic layer of MP tape is softened in such an arrangement that it becomes harder towards the deeper portion. Further, the thickness of the magnetic layer is reduced to a certain range so that the tape can keep the head unsmoothened and rough to have a smooth sliding movement relative to the head. To realize this arrangement, it is preferred that the thickness of the magnetic layer be controlled to from 0.07 to 0.2 μm and the polyisocyanate content in the magnetic layer be zero or controlled less than that of the nonmagnetic layer. More preferably, this can be accomplished by controlling the percent proportion by weight (Hw2) of a polyisocyanate contained in a coating solution of the nonmagnetic layer to the nonmagnetic inorganic powder contained in the coating solution to 2% by weight or more, the percent proportion by weight (Hw1) of a polyisocyanate contained in a coating solution of the magnetic layer to the ferromagnetic metal powder contained in the coating solution to 0% by weight or more, and the difference between Hw1 to Hw2 (ΔH=Hw2−Hw1) to from 2 to 20% by weight, so as to cause a low molecular polyisocyanate to diffuse from the lower nonmagnetic layer into the magnetic layer and hence cause the magnetic layer to be cured.

In the magnetic recording medium according to the first aspect of the present invention comprising a magnetic layer using a ferromagnetic metal powder and a binder resin curable with a polyisocyanate, the present inventors have found, as a result of investigation to obtain compatibility in head touch with a metal evaporated magnetic recording medium comprising a metal thin film, that it is preferred that the ratio of N/Fe is in the range of from 0.010 to 0.90, so as to accomplish the present invention. For example, if a binder comprises polyurethane without any polyisocyanate, the N/Fe ratio is the lower limit, 0.010, since N is ascribed only to the urethane bonds in the polyurethane. If a binder comprises polyurethane and polyisocyanate, the N/Fe value can vary from 0.010 to 0.90 by changing the proportions of polyurethane and polyisocyanate.

In the measurement of N/Fe, an X-ray photoelectron spectrometer (available from PERKIN-ELMER) is used. An Mg anode is used as an X-ray source. The measurement is effected at 300 W. In the measurement, the lubricant is washed away with n-hexane from a tape as a specimen. The tape is then set in the X-ray photoelectron spectrometer. The distance between the X-ray source and the tape is 1 cm. The measurement system is then evacuated. After 5 minutes, N-1s spectrum and Fe-2p (3/2) spectrum of the sample are integrated for 10 minutes for measurement. The pass energy is kept to 100 eV. The integrated intensity ratio to N-1s spectrum measured is then calculated to determine the amount of nitrogen on the surface of the sample.

If the thickness of the magnetic layer exceeds 0.20 µm, it makes the diffusion of a polyisocyanate from the nonmagnetic layer insufficient, reducing the durability of the surface of the magnetic layer. If the thickness of the magnetic layer falls below 0.07 µm, the resulting output is reduced.

It was further found that a magnetic recording medium comprising at least a polyurethane resin in the binder contained in the magnetic layer in a greater amount than that of resins other than the polyurethane resin, and at least a vinyl chloride copolymer and a polyisocyanate in the lower nonmagnetic layer in a greater amount than that of resins other than the vinyl chloride copolymer can exhibit excellent electromagnetic characteristics and a very good head contact.

As mentioned above, if the content of the polyisocyanate to be incorporated in the magnetic layer is small, the agglomeration of the coating solution due to curing can be prevented before coating, prolonging the pot life of the coating solution. This also can raise Bm, making it possible to obtain excellent electromagnetic characteristics at the same time.

A consumer digital VCR (DVC) requires a proper overwritability. The problem is how much a tracking signal having a recording wavelength of 22 µm can be erased when it is overwritten by a 0.5-µm wavelength data signal. In the present invention, the thickness of the magnetic layer is as extremely small as from 0.07 to 0.20 µm, one order lower than that of ordinary metal evaporated tapes. This is because the thinner the magnetic layer is, the more effectively can be effected erasure. However, if the thickness of the magnetic layer is reduced, the signal output is reduced. In order to raise the output, it is necessary that Bm, which is generally from 3,200 to 3,300 G, be drastically raised (to from 3,800 to 6,000 G). In order to raise Bm, it is necessary that the packing of ferromagnetic metal powder in the magnetic layer be raised. In the present invention, the content of the polyisocyanate in the magnetic layer is as small as possible to accomplish its objects.

In the present invention, the thickness of the magnetic layer indicates a dry thickness. In the first aspect of the present invention, the thickness of the magnetic layer is controlled to from 0.07 to 0.20 µm, preferably from 0.08 to 0.18 µm, more preferably from 0.10 to 0.15 µm.

In the first aspect of the present invention, the difference ΔH between the percent proportion by weight (Hw2) of a polyisocyanate contained in the coating solution of the nonmagnetic layer to the nonmagnetic inorganic powder contained in the coating solution and the percent proportion by weight (Hw1) of a polyisocyanate contained in the coating solution of the magnetic layer to the ferromagnetic metal powder contained in the coating solution (ΔH=Hw2-Hw1) is preferably from 2 to 20% by weight, more preferably from 2 to 15% by weight, particularly preferably from 3 to 10% by weight. If ΔH falls below 2% by weight, the head contact cannot be improved. If ΔH exceeds 20% by weight, it increases the amount of the polyisocyanate to be diffused from the nonmagnetic layer to the magnetic layer, causing a deterioration of the surface properties or a drop in Bm of the magnetic layer that impairs the desired effects. Hw2 is generally from 3 to 30% by weight, more preferably from 3 to 20% by weight, particularly preferably from 4 to 10% by weight. Hw1 is generally from 0 to 12% by weight, more preferably from 0 to 10% by weight, particularly preferably from 0 to 7% by weight.

The comparison of the N/Fe ratio of a magnetic recording medium prepared in such an arrangement that ΔH is 5% by weight, that is, the polyisocyanate content in the magnetic layer (upper layer) is 5% by weight less than that of the nonmagnetic layer (lower layer) with that of a magnetic recording medium prepared in such an arrangement that ΔH is zero, that is, the polyisocyanate content in the upper layer and lower layer are the same shows that the former is about 0.02 to 0.045 smaller than the latter for the N/Fe ratio. This makes it possible to estimate the rough maldistribution of the amount of polyisocyanate. In the implementation of the present invention, N/Fe almost corresponds to the amount of polyisocyanate.

The term "binder" as used herein is meant to include for convenience a polyisocyanate, if any, contained in the various constituent layers of the magnetic recording medium, because the mixing ratio or the like is occasionally calculated.

A preferred embodiment of the first aspect of the present invention is a magnetic recording medium comprising at least a polyurethane resin in the binder contained in the magnetic layer adjacent to the nonmagnetic layer, and at least a vinyl chloride copolymer and a polyisocyanate in the binder contained in the nonmagnetic layer, where ΔH of polyisocyanate falls within the above defined range.

In a still preferred embodiment of the magnetic recording medium, the polyurethane resin content in the magnetic layer adjacent to the nonmagnetic layer is the largest among the other resins in the magnetic layer, and the content of the vinyl chloride copolymer in the nonmagnetic layer is the largest among the other binders in the nonmagnetic layer.

The term "magnetic layer adjacent to the nonmagnetic layer" as used herein is meant to indicate the magnetic layer itself if it is a single layer, or the magnetic layer sharing an interface with the nonmagnetic layer if the magnetic layer has a multi-layer structure.

The content of the polyurethane resin based on the weight of the ferromagnetic powder in the magnetic layer is generally from 4 to 25% by weight, preferably from 6 to 20% by weight, more preferably from 8 to 18% by weight. The content of the vinyl chloride copolymer based on the weight of the nonmagnetic powder in the nonmagnetic layer is generally from 5 to 35% by weight, preferably from 8 to 20% by weight, more preferably from 10 to 18% by weight.

The glass transition point Tg of the polyurethane resin is generally from −10° to 140° C., preferably from 0° to 120° C., more preferably from 35° to 90° C., to provide a reduced friction coefficient. The elongation at break of the polyurethane resin is preferably from 100 to 2,000%. The stress at rupture of the polyurethane resin is preferably from 0.05 to 10 kg/cm². The yield point of the polyurethane resin is preferably from 0.05 to 10 kg/cm². The vinyl chloride copolymer preferably contains a proper amount of polar groups to improve the dispersibility thereof and enhance the running durability of the tape.

The nonmagnetic layer may comprise the same polyurethane resin as incorporated in the magnetic layer in addition to the vinyl chloride copolymer in an amount of from 0 to 49% by weight, preferably from 5 to 49% by weight based on the total weight of binder resin.

In the first aspect of the magnetic recording medium of the present invention, the content of the binder in a magnetic layer coating solution is generally from 6 to 30% by weight, preferably from 8 to 25% by weight, more preferably from 10 to 22% by weight, based on the weight of the ferromagnetic metal powder, and the content of the nonmagnetic inorganic powder in the magnetic layer is generally from 3 to 15% by weight, preferably from 4 to 12% by weight, more preferably from 4.5 to 10% by weight based on the weight of the ferromagnetic metal powder.

The first aspect of the present invention can be arranged as mentioned above so that the maximum magnetic flux density Bm of the magnetic layer can be from 3,800 to 6,000 G. The maximum magnetic flux density Bm of the magnetic layer is preferably from 4,000 to 5,800 G, more preferably from 4,300 to 5,500 G.

The second aspect of the present invention will be further described hereinafter.

In the second aspect of the present invention, the thickness of the magnetic layer is from 0.07 to 0.20 $\mu$m. If the thickness of the magnetic layer falls below 0.07 $\mu$m, the output of long wavelength signal is reduced. If the thickness of the magnetic layer exceeds 0.20 $\mu$m, the desired overwritability cannot be secured. The thickness of the magnetic layer is preferably from 0.08 to 0.15 $\mu$m, more preferably from 0.09 to 0.14 $\mu$m.

In the measurement of the thickness of the magnetic layer, the magnetic recording medium is cut in the longitudinal direction by a diamond cutter to a web having a width of about 0.1 $\mu$m. The section of the cut specimen is then observed and photographed under a transmission electron microscope at a magnification of 30,000. The print size of the photograph is A4. Thereafter, paying attention to the difference in the shape of ferromagnetic metal powder and non-magnetic powder between the magnetic layer and the non-magnetic layer, the interface of the two layers is marked black on the photograph by viewing with the naked eye. Similarly, the surface of the magnetic layer is marked black on the photograph. The distance between the two black marking lines is then measured at various measurement points by an image processor IBAS2 available from Zeiss Corp. These measurements are then arithmetically averaged to calculate the thickness of the magnetic layer.

In the second aspect of the present invention, the maximum magnetic flux density Bm is from 3,700 to 6,000 G. If Bm falls below 3,700 G, the output of long wavelength signal is reduced. If Bm exceeds 6,000 G, the overwritability is deteriorated. Bm is preferably from 4,000 to 5,700 G, preferably from 4,500 to 5,500 G.

In the second aspect of the present invention, the coercive force Hc is from 2,000 to 3,000 Oe. Hc as used herein is in the tape running direction. If Hc falls below 2,000 Oe, the desired short wavelength output cannot be secured. If Hc exceeds 3,000 Oe, the head for use in recording is saturated, making it impossible to secure the desired output. Hc is preferably from 2,050 to 2,700 Oe, more preferably from 2,100 to 2,500 Oe.

Bm and Hc are measured at an external magnetic field Hm of 10 kOe by means of a vibrating sample magnetic flux meter (available from Toei Kogyo K. K.).

In the second aspect of the present invention, the higher the squareness ratio of the magnetic layer is, and the lower SFD thereof is, the better is the overwritability thereof. The squareness ratio of the magnetic layer in the tape running direction is generally not less than 0.75, preferably not less than 0.80, more preferably not less than 0.85. The squareness ratio in two directions perpendicular to the tape running direction is preferably not more than 80% of that in the tape running direction. SFD of the magnetic layer is preferably not more than 0.6, more preferably not more than 0.5, ideally zero.

In the second aspect of the present invention, the center line surface roughness Ra of the magnetic layer is from 1.0 to 3.0 nm. In general, Ra is preferably as small as possible to provide the magnetic layer with excellent electromagnetic characteristics. On the contrary, Ra is preferably as large as possible to enhance the running durability of the magnetic layer. Therefore, Ra of the present invention is determined to a small range within which the desired running properties can be secured while satisfying the requirements for output and overwritability. If Ra exceeds 3.0 nm, the resulting spacing loss causes a deterioration of both output and overwritability. In particular, it is made difficult to cause a short wavelength signal to be overwritten on a long wavelength signal recorded deep in the magnetic layer.

RMS surface roughness $R_{RMS}$ determined by AFM evaluation is preferably from 2 to 15 nm.

In the second aspect of the present invention, the center line surface roughness Ra of the nonmagnetic support is from 0.5 to 7.0 nm to reduce the roughness of the interface between the nonmagnetic layer and the magnetic layer and hence improve the surface properties of the magnetic layer. If Ra of the nonmagnetic support falls below 0.5 nm, it causes a rise in the friction coefficient of the surface of the nonmagnetic support, making it difficult to handle at the film-forming step or coating step and hence impairing the appearance of the wound tape. If Ra of the nonmagnetic support exceeds 7.0 nm, it causes a rise in the surface roughness of the magnetic recording medium, reducing the output and C/N ratio. Ra of the nonmagnetic support is preferably from 0.6 to 4 nm, more preferably from 1.0 to 3 nm.

Ra of the magnetic layer and the nonmagnetic support are determined as follows. Using TOPO3D produced by WYKO Corp., Ra of the surface of samples on an area of about 250 nm×250 nm is determined by MIRAU method. The measurement wavelength is about 650 nm. Spherical and cylindrical corrections are made in the measurements. This surface roughness meter is of the non-contact type utilizing optical interference.

When used with DVC, the magnetic recording medium according to the second aspect of the present invention can be adapted to record a 22-$\mu$m wavelength recording signal as a synchronizing signal and a 0.488-$\mu$m wavelength data recording signal at the same time while overwriting a part of the former by the latter at an erasure of not more than −20 dB, preferably not more than −21 dB, more preferably not more than −22 dB. Further, the magnetic recording medium according to the second aspect of the present invention can provide sufficient recording of short wavelength signal as well as secure the desired output of long wavelength signal. Further, the reduction of the overwriting erasability can be accomplished by reducing the thickness of the magnetic layer as well as recording a short wavelength signal such as data signal deep into the magnetic layer. In the second aspect of the present invention, it is made possible to pass recording current as much as possible during the recording of a data signal, making it possible to secure the desired compatibility with ME tapes and hence increase the optimum recording current up to the same level as possible in ME tapes. This is also desirable from the standpoint of overwritability.

Preferred embodiments of the second aspect of the present invention include the following:

(1) The total thickness of the magnetic recording medium of the present invention is from 4.5 to 8.5 μm;

(2) The nonmagnetic support used in the magnetic recording medium of the present invention is a polyethylene naphthalate resin or polyaramide resin;

(3) The nonmagnetic powder to be incorporated in the nonmagnetic layer of the present invention is one or more selected from the group consisting of titanium oxide, α-iron oxide, barium sulfate, zinc oxide and alumina;

(4) The coating solution for the magnetic layer of the magnetic recording medium is free of polyisocyanate;

(5) The content of the binder in the magnetic layer coating solution is from 8 to 24 parts by weight per 100 parts by weight of the ferromagnetic metal powder, and the content of the nonmagnetic powder in the magnetic layer is from 3 to 15 parts by weight per 100 parts by weight; and (6) The lower nonmagnetic layer and at least the magnetic layer adjacent thereto are prepared by a wet-on-wet coating method.

The amount of the binder to be incorporated in the magnetic layer in the second aspect of the present invention is from 8 to 24% by weight, preferably from 12 to 24% by weight, based on the weight of the ferromagnetic metal powder. If the binder contains a vinyl chloride resin, its content is from 5 to 30% by weight. If the binder contains a polyurethane resin, its content is from 2 to 20% by weight. If the binder contains a polyisocyanate resin, its content is from 2 to 20% by weight. Preferably, these components are used in combination. In a particularly preferred embodiment, the magnetic layer is free of polyisocyanate while the lower nonmagnetic layer contains a polyisocyanate. This embodiment has an effect of preventing the polyisocyanate in the magnetic layer from undergoing a curing reaction in a solution that causes agglomeration of the ferromagnetic metal powder.

In the second aspect of the present invention, the polyurethane resin, if used as a binder, preferably exhibits a glass transition temperature of from −50° to 100° C., an elongation at break of from 100 to 2,000%, a stress at rupture of from 0.05 to 10 kg/cm$^2$ and a yield point of from 0.05 to 10 kg/cm$^2$.

The nonmagnetic layer for the first and second aspects of the present invention will be further described hereinafter.

The nonmagnetic powder to be incorporated in the nonmagnetic layer of the present invention is not specifically limited. In general, nonmagnetic inorganic powder, carbon black, nonmagnetic organic powder, etc. may be used.

The nonmagnetic inorganic powder to be incorporated in the nonmagnetic layer of the present invention may be selected from inorganic compounds such as metal oxide, metal carbonate, metal nitride, metal carbide and metal sulfide. Examples of the inorganic compound include α-alumina having a percent α-conversion of not less than 90%, β-alumina, γ-alumina, θ-alumina, silicon carbide, chromium oxide, cerium oxide, α-iron oxide, goethite, corundum, silicon nitride, titanium carbide, titanium oxide, silicon dioxide, tin oxide, magnesium oxide, tungsten oxide, zirconium oxide, boron nitride, zinc oxide, calcium carbonate, calcium sulfate, barium sulfate, and molybdenum disulfate. These may be used singly or in combination. Preferred among these inorganic compounds are titanium oxide, α-iron oxide, barium sulfate, zinc oxide, iron oxide, and alumina from the standpoint of availability, cost, purity and quality uniformity. Particularly preferred among these inorganic compounds are titanium dioxide and α-iron oxide.

The average particle diameter of such a nonmagnetic inorganic powder is preferably in the range of 0.005 to 2 μm. If necessary, nonmagnetic inorganic powders having different particle sizes may be used in combination. Alternatively, a single nonmagnetic inorganic powder having a wide distribution of particle diameter may be used to exert the same effects. In a particularly preferred embodiment, the average particle diameter of nonmagnetic inorganic powder is in the range of 0.01 to 0.2 μm, particularly from 0.02 to 0.08 μm. The tap density of the nonmagnetic inorganic powder is generally in the range of 0.05 to 2 g/ml, preferably 0.2 to 1.5 g/ml. The water content of the nonmagnetic inorganic powder is generally in the range of 0.1 to 5% by weight, preferably 0.2 to 3% by weight, more preferably 0.3 to 1.5% by weight. The pH value of the nonmagnetic inorganic powder is generally in the range of 2 to 11, preferably 5 to 10. The specific surface area of the nonmagnetic inorganic powder is generally in the range of 1 to 100 m$^2$/g, preferably 5 to 70 m$^2$/g, more preferably 10 to 65 m$^2$/g. The crystalline size of the nonmagnetic inorganic powder is preferably in the range of 0.004 to 1 μm, more preferably from 0.075 to 0.2 μm. The oil absorption of the nonmagnetic inorganic powder is generally in the range of 5 to 100 ml/100 g, preferably 10 to 80 ml/100 g, more preferably 20 to 60 ml/100 g as determined with DBP. The specific gravity of the nonmagnetic inorganic powder is generally in the range of 1 to 12, preferably 3 to 6. The shape of the nonmagnetic inorganic powder may be any of needle, sphere, polyhedron and tablet. The needle nonmagnetic inorganic powder, if used, preferably has a major axis length of not more than 0.3 μm. If the powder is granular, its particle diameter is preferably not more than 0.08 μm.

The ignition loss of the nonmagnetic inorganic powder is preferably in the range of not more than 20% by weight. Essentially, it is particularly preferably zero. The Mohs hardness of the foregoing nonmagnetic inorganic powder to be used in the present invention is preferably in the range of 4 to 10. The roughness factor of the surface of the nonmagnetic powder is preferably in the range of 0.8 to 1.5, more preferably 0.9 to 1.2. The inorganic powder generally exhibits an SA (stearic acid) absorption of 1 to 20 μmol/m$^2$, preferably 2 to 15 μmol/m$^2$. The non-magnetic powder contained in the nonmagnetic layer preferably exhibits a heat of wetting by water of 200 to 600 erg/cm$^2$ at a temperature of 25° C. Alternatively, a solvent having a heat of wetting by water in the above defined range may be used. The preferred number of water molecules on the surface of the non-magnetic powder at a temperature of 100° to 400° C. is in the range of 1 to 10 per 100 Å. The pH value of the isoelectric point in water is preferably in the range of 3 to 6.

The surface of the nonmagnetic inorganic powder is preferably treated with $Al_2O_3$, $SiO_2$, $TiO_2$, $ZrO_2$, $SnO_2$, $Sb_2O_3$, or ZnO, more preferably with $Al_2O_3$, $SiO_2$, $TiO_2$, or $ZrO_2$, particularly with $Al_2O_3$, $SiO_2$, or $ZrO_2$ in the light of dispersibility. These surface treating agents may be used singly or in combination. A surface-treated layer obtained by coprecipitation may be used depending on the purpose. Alternatively, the nonmagnetic inorganic powder may be treated with alumina, followed by the treatment of the surface layer with silica, and vice versa. The surface-treated layer may be porous depending on the purpose. In general, the surface-treated layer is preferably homogeneous and dense.

Specific examples of the nonmagnetic inorganic powder contained in the nonmagnetic layer of the present invention include Nanotite (available from Showa Denko K. K.), HIT-100, ZA-G1 (available from Sumitomo Chemical Co., Ltd.), DPN-250, DPN-250BX, DPN-270BX (available from Toda Kogyo Corp.), TTO-51B, TTO-55A, TTO-55B, TTO-55C, TTO-55S, TTO-55D, SN-100, α-iron oxide E270, E271 and E300 (available from Ishihara Sangyo Kaisha Ltd.), STT-4D, STT-30D, STT-30, STT-65C (available from Titan Kogyo K. K.), MT-100S, MT-100T, MT-150W, MT-500B, MT-600B, MT-100F, MT-500HD (available from Teika Co., Ltd.), FINEX-25, BF-1, BF-10, BF-20, ST-M (available from Sakai Chemical Industry Co., Ltd.), DEFIC-Y, DEFIC-R (available from Dowa Mining Co., Ltd.), AS2BM, TiO2P25 (available from Nippon Aerogel K. K.), 100A, 500A (available from Ube Industries, Ltd.), and Y-LOP (available from Titan Kogyo K. K.), and calcined products of them.

Particularly preferred among these nonmagnetic inorganic powders are titanium dioxide powder and α-iron oxide powder. The synthesis of α-iron oxide (hematite) can be accomplished by reference to the synthesis of γ-iron oxide.

The synthesis of α-iron oxide (hematite) can be effected under the following conditions. That is, $\alpha\text{-}Fe_2O_3$ powder employable in the present invention can be prepared from a particulate acicular goethite, as a precursor, obtained by various methods: (i) a method which comprises adding an aqueous solution of an alkali hydroxide to an aqueous solution of ferrous iron in an amount of not less than the equivalent weight, and then aerating the resulting suspension containing ferrous hydroxide colloid with an oxygen-containing gas at pH of not less than 11 and a temperature of not higher than 80° C. so that it undergoes oxidation reaction to produce a particulate acicular goethite; (ii) a method which comprises reacting an aqueous solution of ferrous iron with an aqueous solution of an alkali carbonate to obtain a suspension containing $FeCO_3$, and then aerating the suspension with an oxygen-containing gas so that it undergoes oxidation reaction to produce a particulate spindle-shaped goethite; (iii) a method which comprises adding an aqueous solution of an alkali hydroxide or an aqueous solution of an alkali carbonate to an aqueous solution of ferrous iron in an amount of less than the equivalent weight to obtain an aqueous solution of ferrous iron containing ferrous hydroxide colloid, aerating the aqueous solution with an oxygen-containing gas so that it undergoes oxidation reaction to produce a particulate acicular goethite, adding an aqueous solution of an alkali hydroxide to the aqueous solution of ferrous iron containing nuclear acicular goethite particles in an amount of not less than equivalent of $Fe^{2+}$, and then aerating the aqueous solution with an oxygen-containing gas to allow the nuclear acicular goethite particles to grow; and (iv) a method which comprises adding an aqueous solution of an alkali hydroxide or an aqueous solution of an alkali carbonate to an aqueous solution of ferrous iron in an amount of less than the equivalent weight to obtain an aqueous solution of ferrous iron containing ferrous hydroxide colloid, aerating the aqueous solution of ferrous iron with an oxygen-containing gas so that it undergoes oxidation reaction to allow nuclear acicular goethite particles to grow, and then allowing the nuclear acicular goethite particles to grow in an acidic or neutral region.

Foreign elements which have generally been incorporated in the synthesis system of goethite to improve the characteristics of the goethite powder, such as Ni, Zn, P and Si, may be present.

The particulate acicular goethite as a precursor can be dehydrated at a temperature of from 200° to 500° C., optionally followed by heat treatment for annealing at a temperature of 350° to 800° C., to obtain a particulate acicular $\alpha\text{-}Fe_2O_3$.

The particulate acicular goethite to be dehydrated or annealed may have a sintering inhibitor such as P, Si, B, Zr and Sr attached to the surface thereof.

The reason why the particulate acicular goethite is heat-treated and annealed at a temperature of 350° to 800° C. is because that voids in the surface of the particulate acicular $Fe_2O_3$ obtained by dehydration are preferably filled by melting the surface of the particles to provide a smooth surface.

The particulate $\alpha\text{-}Fe_2O_3$ employable in the present invention can be obtained by a process which comprises dispersing the foregoing particulate acicular $\alpha\text{-}Fe_2O_3$ obtained by dehydration or annealing in an aqueous solution to obtain a suspension, adding an aluminum compound to the suspension, adjusting the pH value of the suspension to coat the surface of the $\alpha\text{-}Fe_2O_3$ with the foregoing additive compounds, filtering the suspension, and then rinsing, drying, crushing, and optionally deaerating and compacting the residue. Examples of the aluminum compound include an aluminum salt such as aluminum acetate, aluminum sulfate, aluminum chloride and aluminum nitrate or an alkali aluminate such as sodium aluminate. The added amount of the aluminum compound is generally from 0.01 to 50% by weight based on the weight of the particulate $\alpha\text{-}Fe_2O_3$ as calculated in terms of aluminum. If the added amount of the aluminum compound falls below 0.01% by weight, the dispersion of the aluminum compound in the binder resin is not sufficient. If the added amount of the aluminum compound exceeds 50% by weight, aluminum compounds suspended in the place other than the surface of the particles disadvantageously interacts with each other.

The nonmagnetic powder to be incorporated in the lower nonmagnetic layer may be coated with, in addition to the aluminum compound, a silicon compound and one or more compound selected from the group consisting of P, Ti, Mn, Ni, Zn, Zr, Sn and Sb compounds. The added amount of these compounds to be used with the aluminum compound are generally each from 0.01 to 50% by weight based on the weight of the $\alpha\text{-}Fe_2O_3$. If the added amount of these compounds each fall below 0.01% by weight, it can exert little or no effect of enhancing the dispersibility of the powder. If the added amount of these compounds each exceed 50% by weight, compounds suspended in the place other than the surface of the particles disadvantageously interact with each other.

Titanium dioxide will be further described hereinafter. The preparation of titanium dioxide can be generally accomplished by sulfate process or chlorine process.

In the sulfate process, ilumenite ore is digested with sulfuric acid to extract Ti, Fe, etc. as sulfates. Iron sulfate is then removed by crystallization. The residual titanyl sulfate solution is purified by filtration, and then thermally hydrolyzed to cause hydrous titanium hydroxide to be precipitated. The hydrous titanium hydroxide thus precipitated is filtered, and then washed. Impurities are removed by washing. A particle diameter adjustor or the like is then added to the material. The material is then calcined at a temperature of 80° to 1,000° C. to produce coarse titanium dioxide. The titanium dioxide is of rutile type or anatase type depending on the kind of nucleating agent added upon hydrolyzation. The coarse titanium dioxide may be ground, classified, and then subjected to surface treatment, etc. to produce the desired non-magnetic powder.

In the chlorine process, natural rutile or synthetic rutile is used as the ore. The ore is chlorinated in a high temperature reduced condition so that Ti is converted to $TiCl_4$ and Fe is converted to $FeCl_2$. Iron oxide solidified by cooling is separated from the liquid $TiCl_4$. The resulting crude $TiCl_4$ is then purified by fractionating. To $TiCl_4$ is then added a nucleating agent. The reaction mixture is momentarily reacted with oxygen at a temperature of not lower than 1,000° C. to obtain crude titanium dioxide. The crude titanium dioxide produced by the oxidative decomposition process is then subjected to finishing in the same manner as in the sulfate process to serve as a pigment.

In the surface treatment, the foregoing crude titanium dioxide can be dry-ground, wet-ground with water and a dispersant, and then subjected to centrifugal separation to remove coarse particles. The resulting fine slurry is transferred to the surface treatment tank where it is then coated with a metal hydroxide. For example, a predetermined amount of an aqueous solution of a salt such as Al, Si, Ti, Zr, Sb, Sn and Zn is prepared in the surface treatment tank. The aqueous salt solution is then neutralized with an acid or alkali to produce a hydrous oxide with which the surface of titanium dioxide particles is coated. The water-soluble salts by-produced are removed by decantation, filtration and washing. The slurry is adjusted for a proper pH, filtered, and then washed with pure water. The cake thus washed is then dried by a spray dryer or band dryer. The dried material is finally ground by a jet mill to provide a product. Instead of being treated in an aqueous system, the titanium dioxide powder may be subjected to surface treatment with Al or Si by passing $AlCl_3$ or $SiCl_4$ vapor through the powder, and then introducing water vapor thereinto. For the preparation of other pigments as the nonmagnetic powder, reference can be made to G. D. Parfitt and K. S. W. Sing, *Characterization of Powder Surfaces*, Academic Press, 1976.

A carbon black may be incorporated in the nonmagnetic layer to reduce the surface resistivity Rs and the light transmittance thereof as well as provide a desired micro Vickers hardness. The micro Vickers hardness of the nonmagnetic layer is generally from 25 to 60 kg/mm$^2$, preferably from 30 to 50 kg/mm$^2$ to provide a well-adjusted head contact. The micro Vickers hardness of the nonmagnetic layer can be determined by means of a thin film hardness meter HMA-400 available from NEC Corp. with a diamond triangular pyramid needle having a sharpness of 80 degree and tip radius of 0.1 μm as an indenter foot.

The light transmittance of the nonmagnetic layer is generally not more than 3% with respect to infrared ray having a wavelength of about 900 nm, e.g., not more than 0.8% for VHS tape as the industrial standard. To this end, furnace black for rubber, thermal black for rubber, acetylene black, etc. may be used.

The carbon black exhibits a specific surface area (BET) of 100 to 500 m$^2$/g, preferably 150 to 400 m$^2$/g, and an oil absorption of 20 to 400 ml/100 g, preferably 30 to 200 ml/100 g as determined with DBP. The carbon black exhibits a particle diameter of 5 to 80 mμ, preferably 10 to 50 mμ, particularly 10 to 40 mμ. The carbon black preferably exhibits a pH value of 2 to 10, a water content of 0.1 to 10% and a tap density of 0.1 to 1 g/ml.

Specific examples of the carbon black employable in the present invention include BLACKPEARLS 2000, 1300, 1000, 900, 800, 880, 700, VULCAN XC-72 (available from Cabot Corp.), #3050B, 3150B, 3250B, #3750B, #3950B, #950, #650B, #970B, #850B, MA-600 (available from Mitsubishi Chemical Corp.), CONDUCTEX SC, RAVEN 8800, 8000, 7000, 5750, 5250, 3500, 2100, 2000, 1800, 1500, 1255, 1250 (available from Columbia Carbon Corp.), and Ketchen Black EC (available from Aczo Corp.). These carbon blacks may be surface-treated with a dispersant, grafted with a resin or partially graphtized before use. These carbon blacks may be added to the magnetic coating in the form of dispersion in a binder. These carbon blacks may be used in an amount of not more than 50% by weight based on the weight of the nonmagnetic powder or not more than 40% by weight based on the total weight of the nonmagnetic layer. These carbon blacks may be used singly or in combination.

For the details of the carbon black employable in the present invention, reference can be made to *Carbon Black Binran* (Handbook of Carbon Black), Carbon Black Kyokai, Japan.

An organic powder may further be incorporated in the nonmagnetic layer depending on the purpose. For example, acrylstyrene resin powder, benzoguanamine resin powder, melamine resin powder, and phthalocyanine pigment may be used. Further, polyolefin resin powder, polyester resin powder, polyamide resin powder, polyimide resin powder, and polyfluoroethylene resin may be used. The preparation of these organic powders can be accomplished by the method as described, e.g., in JP-A-62-18564 and JP-A-60-255827.

It is a common practice to provide an undercoating layer in an ordinary magnetic recording medium to enhance the adhesivity between the support and the magnetic layer or other layers, which can also be applied to the present invention. The thickness of the undercoating layer is generally in the range of not more than 0.5 μm.

For the binder, lubricant, dispersant, additives and solvent to be incorporated in the nonmagnetic layer and the method for dispersing these components, those used for the magnetic layer can be employed. In particular, for the amount and kind of the binder, additives and dispersant, the known technique for the magnetic layer can be employed.

The magnetic layer for the first and second aspects of the present invention will be further described hereinafter.

As the ferromagnetic powder to be incorporated in the magnetic layer of the present invention, a known ferromagnetic powder can be used, such as ferromagnetic metal powder mainly composed of α-Fe, Ni or Co (not lower than 75%). Preferred among these ferromagnetic metal powders is a ferromagnetic alloy powder mainly composed of α-Fe. Such a ferromagnetic powder may further contain atoms other than predetermined atoms, such as Al, Si, S, Sc, Ca, Ti, V, Cr, Cu, Y, Mo, Rh, Pd, Ag, Sn, Sb, Te, Ba, Ta, W, Re, Au, Hg, Pb, Bi, La, Ce, Pr, Nd, P, Co, Mn, Zn, Ni, Sr, and B. In particular, Al, Si, Ca, Y, Ba, La, Nd, Co, Ni, and B are important elements to be contained in the ferromagnetic metal powder in addition to α-Fe. Such a ferromagnetic powder may be treated with a dispersant, lubricant, surface active agent or antistatic agent as described later before dispersion. This is further described in JP-B-44-14090 (The term "JP-B" as used herein means an "examined Japanese patent publication"), JP-B-45-18372, JP-B-47-22062, JP-B-47-22513, JP-B-46-28466, JP-B-46-38755, JP-B-47-4286, JP-B-47-12422, JP-B-47-17284, JP-B-47-18509, JP-B-47-18573, JP-B-39-10307, JP-B-48-39639, and U.S. Pat. Nos. 3,026,215, 3,031,341, 3,100,194, 3,242,005, and 3,389,014.

The ferromagnetic metal powder may contain a small amount of hydroxide or oxide. In order to prepare such a ferromagnetic alloy powder, known preparation methods can be used. These methods include a method which comprises the reduction with a composite organic acid salt (mainly oxalate) and a reducing gas such as hydrogen, a method which comprises the reduction of iron oxide with a reducing gas such as hydrogen to obtain Fe or Fe-Co particles, a method which comprises the pyrolysis of a metallic carbonyl compound, a method which comprises adding a reducing agent such as sodium borohydride, hypophosphite and hydrazine to an aqueous solution of a ferromagnetic metal to reduce the ferromagnetic metal, and a method which comprises the evaporation of a metal in an inert gas under reduced pressure to obtain a finely divided powder. The ferromagnetic metal powder thus obtained may be subjected to a known deoxidation treatment such as process which comprises dipping the ferromagnetic metal powder in an organic solvent, and then drying the material, process which comprises dipping the ferromagnetic metal powder in an organic solvent with an oxygen-containing gas bubbled thereinto to form an oxide film on the surface of the ferromagnetic metal powder, and then drying the material, and process which comprises controlling the partial pressure of oxygen gas and inert gas instead of using an organic solvent to form an oxide film on the surface of the ferromagnetic metal powder.

The coercive force Hc of the ferromagnetic metal powder to be contained in the magnetic layer is generally from 1,500 to 4,000 Oe, preferably from 1,800 to 3,500 Oe, more preferably from 2,000 to 3,000 Oe. The saturated magnetization as of the ferromagnetic metal powder is generally from 110 to 190 emu/g, preferably from 125 to 180 emu/g, more preferably from 130 to 160 emu/g. The length of the major axis of the ferromagnetic metal powder is generally from 0.03 to 0.25 μm, preferably from 0.04 to 0.15 μm, more preferably from 0.05 to 0.13 μm. The crystalline size of the ferromagnetic metal powder is generally from 80 to 300 Å, preferably from 100 to 200 Å, more preferably from 120 to 190 Å. The acicularity ratio of the ferromagnetic metal powder is preferably from 4 to 18, more preferably from 5 to 12. The water content of the ferromagnetic metal powder is preferably from 0.01 to 2%. The water content of the ferromagnetic metal powder is preferably optimized depending on the kind of the binder used.

The ferromagnetic metal powder to be incorporated in the magnetic layer of the present invention generally exhibits a specific surface area of 25 to 80 m$^2$/g, preferably 50 to 70 m$^2$/g as determined by BET method. If the specific surface area falls below 25 m$^2$/g, the resulting magnetic recording medium may suffer from a high noise. If the specific surface area exceeds 80 m$^2$/g, the desired surface properties may not be easily obtained.

The pH value of the ferromagnetic metal powder is preferably optimized depending on the kind of the binder to be used in combination. The pH value of the ferromagnetic metal powder is generally in the range of 4 to 12, preferably 6 to 10. The ferromagnetic metal powder may be subjected to surface treatment with Al, Si, P or oxide thereof as necessary. The amount of such a surface treatment is in the range of 0.1 to 10%. The adsorption of a lubricant such as aliphatic acid by the ferromagnetic metal powder thus surface-treated is advantageously in the range of 100 mg/m$^2$. Where the ferromagnetic metal powder may contain soluble inorganic ions such as Na, Ca, Fe, Ni and Sr ions in some cases, if the content of such these inorganic ion is 200 ppm or less, there are no remarkable influence on the properties of the magnetic layer.

The ferromagnetic metal powder to be used in the present invention preferably has as small void as possible, i.e., 20% by volume or less, more preferably 0 to 5% by volume. The shape of the ferromagnetic metal particles may be selected from needle, grain, rice grain, tablet, etc. so as to satisfy the above mentioned requirements for particle size. In order to keep SFD of the ferromagnetic metal powder to not more than 0.6, the distribution of Hc in the ferromagnetic metal powder needs to be reduced. To this end, the particle size distribution of goethite may be improved, and γ-hematite may be prevented from being sintered.

As the binder resins to be used in the present invention, known thermoplastic resins, thermosetting resins, reactive resins or mixture thereof can be used.

Examples of the thermoplastic resins include those having a glass transition temperature of −100° to 150° C., a number-average molecular weight of 1,000 to 200,000, preferably 10,000 to 100,000, and a polymerization degree of about 50 to 1,000. Specific examples of such thermoplastic resins include polymers or copolymers containing as constituent units vinyl chloride, vinyl acetate, vinyl alcohol, maleic acid, acrylic acid, ester acrylate, vinylidene chloride, acrylonitrile, methacrylic acid, ester methacrylate, styrene, butadiene, ethylene, vinyl butyral, vinyl acetal, vinyl ether, etc., polyurethane resins, and various rubber resins.

Specific examples of the thermosetting resins and reactive resins include phenol resin, epoxy resin, polyurethane hardening resin, urea resin, melamine resin, alkyd resin, acrylic reactive resin, formaldehyde resin, silicone resin, epoxy-polyamide resin, mixture of polyester resin and isocyanate prepolymer, mixture of polyester polyol and polyisocyanate, and mixture of polyurethane and polyisocyanate.

These resins are further described in "Plastic Handbook", Asakura Shoten, Japan.

Further, known electron radiation curing resins can be incorporated in either the nonmagnetic layer or magnetic layer.

Examples of these resins and their preparation methods are further described in JP-A-62-256219.

The above-described resins can be used singly or in combination. Preferred examples of such a combination of resins include a combination of at least one selected from vinyl chloride resin, vinyl chloride-vinyl acetate resin, vinyl chloride-vinyl acetate-vinyl alcohol resin and vinyl chloride-vinyl acetate-maleic anhydride copolymer with a polyurethane resin, and a combination thereof with polyisocyanate. Examples of the structure of polyurethane resins which can be used in the present invention include known structures such as polyester polyurethane, polyether polyurethane, polyether polyester polyurethane, polycarbonate polyurethane, polyester polycarbonate polyurethane and polycaprolactone polyurethane. Of all these binders, those in which at least one polar group selected from —COOM, —SO$_3$M, —OSO$_3$M, —P=O(OM)$_2$, —O—P=(OM)$_2$) (in which M represents a hydrogen atom or an alkaline metal salt group), —OH, —NR$^2$, —N$^+$R$^3$ (in which R is a hydrocarbon group), epoxy group, —SH, —CN, sulfobetaine, carboxybetaine and phosphobetaine has been introduced by copolymerization or addition reaction may be optionally used to obtain better dispersibility and durability.

The amount of such a polar group is generally in the range of $10^{-1}$ to $10^{-8}$ mol/g, preferably $10^{-2}$ to $10^{-6}$ mol/g.

Specific examples of these binders to be used in the present invention include VAGH, VYHH, VMCH, VAGF, VAGD, VROH, VYES, VYNC, VMCC, XYHL, XYSG, PKHH, PKHJ, PKHC and PKFE available from Union Carbide, MPR-TA, MPR-TA5, MPR-TAL, MPR-TSN, MPR-TMF, MPR-TS, MPR-TM and MPR-TAO available from Nisshin Kagaku Kogyo K. K., 1000W, DX80, DX81, DX82, DX83 and 100FD available from The Electro Chemical Industrial Co., Ltd., MR-104, MR-105, MR110, MR100, 400X-110A available from Nippon Zeon, Nippolan N2301, N2302 and N2304 available from Nippon Urethane, T-5105, T-R3080 and T-5201, Barnok D-400 and D-210-80, and Crisbon 6109 and 7209 available from Dainippon Ink And Chemicals, Incorporated, Vylon UR8200, UR8300, UR8600, UR5500, UR4300, RV530, RV280, FB-84 and FB-79 available from Toyobo Co., Ltd., Difelamine 4020, 5020, 5100, 5300, 9020, 9022 and 7020 available from Dainichi Seika K. K., MX5004 available from Mitsubishi Chemical Industries Ltd., Saprene SP-150, TIM-3003 and TIM-3005 available from Sanyo Kasei K. K., and Salan F310 and F210 available from Asahi Chemical Industry Co., Ltd. Preferred among these compounds are MR-104, MR110, UR-8200, UR-8300, UR-8600, UR-5500, UR-4300 and TIM-3005.

The magnetic recording medium of the present invention comprises at least two layers, i.e., the nonmagnetic layer and the magnetic layer. The nonmagnetic layer and the magnetic layer may each have a single layer or multi-layer structure. Accordingly, the amount of the binder, the amount of vinyl chloride resin, polyurethane resin, polyisocyanate or other resins to be contained in the binder, the molecular weight of resins constituting the magnetic layer, the amount of polar group, or the physical properties of the above mentioned resins can be altered from layer to layer according to the present invention. The known technique for multi-layer magnetic layer can be employed. For example, if the amount of the binder differs among the upper layer (magnetic layer), the lower layer (nonmagnetic layer) and the interlayer (magnetic layer or nonmagnetic layer), it is useful to increase the amount of the binder to be contained in the magnetic layer in order to reduce the occurrence of scratch on the surface of the magnetic layer. In order to improve the touch of the magnetic recording medium to the head, the amount of the binder to be contained in interlayers other than the magnetic layer may be increased to render the magnetic recording medium flexible.

Examples of polyisocyanates which can be used in the present invention include isocyanates such as tolylenediisocyanate, 4,4'-diphenylmethane diisocyanate, hexamethylene diisocyanate, xylylene diisocyanate, naphthylene-1,5-diisocyanate, o-toluidine diisocyanate, isophorone diisocyanate and triphenylmethane triisocyanate, reaction products of these isocyanates with polyalcohols, and polyisocyanates produced by the condensation of isocyanates. Examples of the trade names of these commercially available isocyanates include Colonate L, Colonate HL, Colonate 2030, Colonate 2031, Millionate MR and Millionate MTL available from Nippon Polyurethane, Takenate D-102, Takenate D-110N, Takenate D-200 and Takenate D-202 available from Takeda Chemical Industries, Ltd., and Desmodur L, Desmodur IL, Desmodur N and Desmodur HL available from Sumitomo Bayer. These isocyanates may be used singly. Alternatively, by making the best use of the difference in hardening reactivity, two or more of these isocyanates can be used in combination in both the nonmagnetic layer and the magnetic layer.

Examples of carbon black to be incorporated in the magnetic layer of the present invention include furnace black for rubber, thermal black for rubber, black for color, acetylene black, etc. Such carbon black preferably has a specific surface area of 5 to 500 $m^2/g$, a DBP oil adsorption of 10 to 400 ml/100 g, a particle diameter of 5 nm to 300 nm, a pH value of 2 to 10, a water content of 0.1 to 10%, and a tap density of 0.1 to 1 g/cc. Specific examples of carbon black to be used in the present invention include BLACKPEARLS 2000, 1300, 1000, 900, 800, 880, 700, VULCAN and XC-72 produced by Cabot, #80, #60, #55, #50, and #35 produced by Asahi Carbon, #2400, #2300, #900, #1000, #30, #40, and #10B produced by Mitsubishi Chemical Industries Ltd., CONDUCTEX SC and RAVEN 150, 50, 40 and 15 produced by Columbia Carbon.

These carbon blacks may be surface-treated with a dispersant, grafted with a resin or partially graphtized before use. These carbon blacks may be previously dispersed in a binder before being added to the nonmagnetic coating. These carbon blacks may be used singly or in combination. If carbon black is to be used, its content is preferably in the range of 0.1 to 30% based on the weight of ferromagnetic powder. Carbon black serves to inhibit the electrification of the magnetic layer, reduce the frictional coefficient, provide light screening effect, enhance the film strength, etc. These functions vary with the kind of carbon black used. It goes without saying that these carbon blacks may be different in its kind, content and combination from the magnetic layer to the nonmagnetic layer depending on the previously specified properties such as particle size, oil adsorption, electrical conductivity and pH. For carbon blacks which can be incorporated in the upper layer of the present invention, reference can be made to *Carbon Black Binran* (Handbook of Carbon Black), Carbon Black Kyokai, Japan.

Specific examples of abrasives to be used in upper magnetic layer of the present invention include known materials having a Mohs hardness of not less than 6 such as α-alumina having a percent alpha conversion of not less than 90%, β-alumina, silicon carbide, chromium oxide, cerium oxide, α-iron oxide, corundum, artificial diamond, silicon nitride, silicon carbide, titanium carbide, titanium oxide, silicon dioxide, and boron nitride. These materials may be used singly or in combination. A composite material made of these abrasives (abrasive surface-treated with another abrasive) may be used. These abrasives may contain compounds or elements other than main component but exert similar effects so far as the content of the main component is not less than 90%.

The particle size of these abrasives is preferably in the range of 0.01 to 2 μm. If necessary, a plurality of abrasives having different particle sizes may be used in combination or a single abrasive having a wide particle diameter distribution may be used to provide similar effects. The tap density of these abrasives is preferably in the range of 0.3 to 2 g/ml. The water content of these abrasives is preferably in the range of 0.1 to 5%. The pH value of these abrasives is preferably in the range of 2 to 11. The specific surface area of these abrasives is preferably in the range of 1 to 30 $m^2/g$. The abrasives to be used in the present invention may be in the form of needle, sphere and cube. The abrasives to be used in the present invention may preferably have edges partially on the surface thereof to provide a high abrasion.

Specific examples of abrasives to be used in the present invention include AKP-20, AKP-30, AKP-50, HIT-50, HIT-60, HIT-60A, HIT-80, HIT-80G, and HIT-100 available from Sumitomo Chemical Co., Ltd., G5, G7, and S-1 available from The Nippon Chemical Industrial Co., Ltd., and TF-100, and TF-140 available from Toda Kogyo K. K. The abrasives to be used in the present invention can be varied in the kind, content and combination from the nonmagnetic layer to the magnetic layer depending on the purpose. These abrasives may be incorporated in the magnetic coating in the form of dispersion in a binder. The amount of the abrasive to be present on the surface and edge of the magnetic layer in the magnetic recording medium of the present invention is preferably in the range of not less than 50 particles per 100 $\mu m^2$.

Examples of other additives to be used in the present invention include those having a lubricating effect, an antistatic effect, a dispersing effect, a plasticizing effect, etc. Specific examples thereof include molybdenum disulfide, tungsten disulfide, graphite, boron nitride, fluorinated graphite, silicone oil, silicone having a polar group, aliphatic acid-modified silicone, fluorine-containing silicone, fluorine-containing alcohol, fluorine-containing ester, polyolefin, polyglycol, ester alkylphosphate and alkaline metal salt thereof, ester alkylsulfate and alkaline metal salt thereof, polyphenyl ether, fluorine-containing ester alkylsulfate and alkaline metal salt thereof, monoaliphatic ester, dialiphatic ester or trialiphatic ester of $C_{10-24}$ monobasic aliphatic acid (which may contain an unsaturated bond or may be branched) and salt thereof with metals (e.g., Li, Na, K, Cu), $C_{12-22}$ monovalent, divalent, trivalent, tetravalent, pentavalent and hexavalent alcohol (which may contain an unsaturated bond or may be branched), $C_{12-22}$ alkoxy alcohol or $C_{10-24}$ monobasic aliphatic acid (which may contain an unsaturated bond or may be branched) with one of C2-12 monovalent, divalent, trivalent, tetravalent, pentavalent and hexavalent alcohols (which may contain an unsaturated bond or may be branched), aliphatic ester of monoalkyl ether of alkylene oxide polymer, $C_{8-22}$ aliphatic amide, $C_{8-22}$ aliphatic amine, etc.

Specific examples of such additives include lauric acid, myristic acid, palmitic acid, stearic acid, behenic acid, butyl stearate, oleic acid, linoleic acid, linolenic acid, elaidic acid, octyl stearate, amyl stearate, isooctyl stearate, octyl myristate, butoxyethyl stearate, anhydrosorbitan monostearate, anhydrosorbitan distearate, anhydrosorbitan tristearate, oleyl alcohol, and lauryl alcohol. Further, nonionic surface active agents can be used, such as alkylene oxide, glycerin, glycidol and alkylphenolethylene oxide addition product, cationic surface active agents such as cyclic amine, ester amide, quaternary ammonium salt, hydantoin derivative, heterocyclic compound, phosphonium and sulfonium, anionic surface active agents containing polar groups such as carboxylic acid, sulfonic acid, phosphoric acid, ester sulfate and ester phosphate, amphoteric surface active agents such as amino acid, aminosulfonic acid, sulfuric or phosphoric ester of amino alcohol and alkylbetaine, etc. These surface active agents are further described in *Kaimen Kasseizai Binran* (Handbook of Surface Active Agents), Sangyo Tosho K. K. These lubricants, antistatic agents, etc. may not be necessarily 100% pure but may contain impurities such as isomer, unreacted material, by-product, decomposition product and oxide. The content of these impurities is preferably in the range of not more than 30%, more preferably not more than 10%.

These lubricants and surface active agents to be used in the present invention may be varied in their kind and content from the nonmagnetic layer to the magnetic layer as necessary. For example, aliphatic acids may be varied in its melting point from the nonmagnetic layer to the magnetic layer to control the oozing thereof to the surface. Esters may be varied in its boiling point or polarity from the undercoating layer to the magnetic layer to control the oozing thereof to the surface. The content of surface active agents may be controlled to improve the coating stability. The content of a surface active agent in the undercoating layer may be higher than that in the magnetic layer to improve the lubricating effect. The present invention is not limited to these examples.

The additives to be used in the present invention may be entirely or partially added to the system at any steps during the preparation of the magnetic coating solution. For example, these additives may be mixed with ferromagnetic metal powder before kneading. Further, these additives may be added to the system at the step of kneading ferromagnetic metal powder with a binder and a solvent. Alternatively, these additives may be added to the system during or after the dispersion step or shortly before the coating step. Depending on the purpose, additives may be partially or entirely applied by the simultaneous or successive coating method after the application of the magnetic layer. Further, a lubricant may be applied to the surface of the magnetic layer after calendering or slitting depending on the purpose.

Examples of the trade name of these lubricants to be used in the present invention include NAA-102, NAA-415, NAA-312, NAA-160, NAA-180, NAA-174, NAA-175, NAA-222, NAA-34, NAA-35, NAA-171, NAA-122, NAA-142, NAA-160, NAA-173K, castor hardened aliphatic acid, NAA-42, NAA-44, Cation SA, Cation MA, Cation AB, Cation BB, Nymean L-201, Nymean L-202, Nymean S-202, Nonion E-208, Nonion P-208, Nonion S-207, Nonion K-204, Nonion NS-202, Nonion NS-210, Nonion HS-206, Nonion L-2, Nonion S-2, Nonion S-4, Nonion 0-2, Nonion LP-20R, Nonion PP-40R, Nonion SP-60R, Nonion OP-80R, Nonion OP-85R, Nonion LT-221, Nonion ST-221, Nonion OT-221, Monogly MB, Nonion DS-60, Anon BF, Anon LG, butyl stearate, butyl laurate, and erucic acid available from Nippon Oils And Fats Co., Ltd., oleic acid available from Kanto Kagaku K. K., FAL-205 and FAL-123 available from Takemoto Yushi K. K., Enujelb LO, Enujelb IPM and Sansosizer E4030 available from Shinnihon Rika K. K., TA-3, KF-96, KF-96L, KF-96H, KF-410, KF-420, KF-965, KF-54, KF-50, KF-56, KF-907, KF-851, X-22-819, X-22-822, KF-905, KF-700, KF-393, KF-857, KF-860, KF-865, X-22-980, KF-101, KF-102, KF-103, X-22-3710, X-22-3715, KF-910, and KF-3935 available from The Shin-etsu Chemical Industry Co., Ltd., Armide P, Armide C, and Armoslip CP available from Lion Armor, Duomine TDO available from The Lion Fat and Oil Co., Ltd., BA-41G available from The Nisshin Oil Mills, Ltd., and Profan 2012E, New Pole PE61, Ionet MS-400, Ionet MO-200, Ionet DL-200, Ionet DS-300, Ionet DS-1000, and Ionet DO-200 available from Sanyo Kasei K. K.

Examples of organic solvents which can be used in the preparation of the magnetic recording medium of the present invention include ketones such as acetone, methyl ethyl ketone, methyl isobutyl ketone, diisobutyl ketone, cyclohexanone, isophorone and tetrahydrofuran, alcohols such as methanol, ethanol, propanol, butanol, isobutyl alcohol, isopropyl alcohol and methyl cyclohexanol, esters such as methyl acetate, butyl acetate, isobutyl acetate, isopropyl acetate, ethyl butyrate and glycol acetate, glycol ethers such as glycol dimethyl ether, glycol monoethyl ether and dioxane, aromatic hydrocarbons such as benzene, toluene, xylene, cresol and chlorobenzene, chlorinated hydrocarbons such as methylene chloride, ethylene chloride, carbon tetrachloride, chloroform, ethylene chlorohydrin and dichlorobenzene, N,N-dimethylformamide, and hexane. These organic solvents may be used in any proportions.

These organic solvents are not necessarily 100% pure and may contain impurities such as isomers, unreacted matters, side reaction products, decomposition products, oxides and water content besides main components. The content of these impurities is preferably in the range of not more than 30%, more preferably not more than 10%. The kind of organic solvents to be used in the present invention may be the same from the magnetic layer to the interlayer. A solvent having a high surface tension (e.g., cyclohexanone, dioxane) may be used for the interlayer to enhance the coating stability. Specifically, it is essential that the arithmetic mean of the solvent composition for the magnetic layer is not smaller than that of the solvent composition for the nonmagnetic layer. In order to enhance the dispersibility, the polarity of the organic solvent is preferably somewhat high. The solvents to be used for these layers preferably contain a solvent having a dielectric constant of 15 to 20 in an amount of not less than 50% by weight. The solubility parameter of these solvents is preferably in the range of 8 to 11.

In the thickness configuration of the magnetic recording medium according to the first aspect of the present invention, the thickness of the nonmagnetic support is generally from 2 to 9 µm, preferably from 3 to 7.5 µm, more preferably from 4.0 to 6.5 µm. The thickness of the nonmagnetic layer is generally from 0.2 to 5 µm, preferably from 0.3 to 2.5 µm, more preferably from 0.5 to 2.0 µm. An adhesive layer may be provided between the nonmagnetic support and the nonmagnetic layer to enhance the adhesion therebetween. The thickness of the adhesive layer is generally from 0.01 to 2 µm, preferably from 0.02 to 0.5 µm. A back coat layer may be provided on the side of the nonmagnetic support opposite the magnetic layer. The thickness of the back coat layer is generally from 0.1 to 2 µm, preferably 0.3 to 1.0 µm. As these adhesive and back coat layers, any known materials can be used.

The total thickness of the magnetic recording medium according to the first aspect of the present invention is generally from 3.0 to 12 µm, preferably from 4.5 to 10 µm, more preferably from 5 to 9 µm. If the total thickness falls below 3.0 µm, the tape may exhibit a reduced stiffness, making it impossible to obtain a sufficient running durability or occasionally making head tape interface unstable. If the total thickness exceeds 12 µm, the tape may exhibit too high a stiffness, making it impossible to obtain a smooth head tape interface.

In the thickness configuration of the magnetic recording medium according to the second aspect of the present invention, the thickness of the nonmagnetic support is generally from 2.0 to 8.0 µm, preferably from 3.0 to 7.5 µm, more preferably from 4.0 to 7.0 µm. The thickness of the lower nonmagnetic layer is generally from 0.2 to 4.0 µm, preferably from 0.3 to 2.0 µm, more preferably from 0.5 to 1.5 µm. An adhesive layer may be provided between the nonmagnetic support and the lower nonmagnetic layer to enhance the adhesion therebetween. The thickness of the adhesive layer is generally from 0.01 to 2 µm, preferably from 0.02 to 0.5 µm. A back coat layer may be provided on the side of the nonmagnetic support opposite the magnetic layer. The thickness of the back coat layer is generally from 0.1 to 2 µm, preferably 0.3 to 1.0 µm. As these adhesive and back coat layers, any known materials can be used.

The total thickness of the magnetic recording medium according to the second aspect of the present invention is generally from 4.5 to 8.5 µm, preferably from 5.0 to 7.3 µm, more preferably from 6.3 to 7.3 µm. If the total thickness falls below 4.5 µm, the tape may exhibit a reduced stiffness, making it impossible to obtain a sufficient running durability or occasionally making head tape interface unstable. If the total thickness exceeds 8.5 µm, the tape may exhibit too high a stiffness, making it impossible to obtain a smooth head tape interface.

The nonmagnetic support used in the present invention generally has a micro Vickers hardness of from 75 to 150 $kg/mm^2$, preferably from 50 to 100 $kg/mm^2$. As such a nonmagnetic support, any known film material can be used, such as biaxially-oriented polyethylene naphthalate, polyamide, polyimide, aromatic polyamide and polybenzoxidazole. In particular, a nonmagnetic support comprising an alamide resin or polyethylene naphthalate may be preferably used to obtain a sufficient stiffness even if it is thin.

These nonmagnetic support may be previously subjected to corona discharge, plasma treatment, treatment for facilitating adhesion, heat treatment, dust-resistant finish, etc.

The center line average surface roughness of the side of the nonmagnetic support to which the lower nonmagnetic layer is applied is controlled to from 0.5 to 7.0 µm in the second aspect of the present invention as defined above. However, the center line average surface roughness of the side of the nonmagnetic support to which the lower nonmagnetic layer is applied is not specifically limited in the first aspect of the present invention. In the first aspect of the present invention, it is generally from not less than 0.1 nm to not more than 10 nm, preferably from not less than 0.2 nm to not more than 6 nm, more preferably from not less than 0.5 nm to not more than 4 nm. Such a nonmagnetic support preferably not only has a small average surface roughness on the center line but also has no big protrusions having a size of not less than 1 µm.

The shape of the surface roughness may be freely controlled by the size and amount of filler to be incorporated in the support as necessary. Examples of the filler include oxide and carbonate of Al, Ca, Si, and Ti, regardless of whether it is crystalline or amorphous, and finely divided powder of organic material such as acryl and melamine. It is preferred that the roughness of the side of the nonmagnetic support to which the back layer is applied be greater than that of the side of the nonmagnetic support to which the magnetic layer is applied to meet the foregoing requirements and running durability at the same time. The center line surface roughness of the side of the nonmagnetic support to which the back layer is applied is preferably not less than 1 nm, more preferably not less than 4 nm. In the case where the surface roughness of the nonmagnetic support is altered from the side to which the magnetic layer is applied to the side to which the back layer is applied, a multi-layer support may be used. Alternatively, the difference of surface roughness can be made by providing a coating layer.

The nonmagnetic support to be used in the present invention preferably exhibits F-5 values of 10 to 50 $kg/mm^2$ in the web running (lengthwise) direction and 10 to 30 $kg/mm^2$ in the web width (crosswise) direction. In general, F-5 value in the web lengthwise direction is higher than F-5 value in the web width direction. However, if the crosswise strength of the nonmagnetic support needs to be high, the present invention is not limited to this specification. The nonmagnetic support preferably exhibits a lengthwise and crosswise heat shrinkage of not more than 3%, more preferably not more than 1.5% at 100° C. for 30 minutes and not more than 1%, more preferably not more than 0.5% at 80° C. for 30 minutes. The breaking strength of the support is preferably in the range of 5 to 100 $kg/mm^2$ in both directions. The elastic modulus of the support is preferably in the range of 100 to 2,000 $kg/mm^2$ in both directions. The light transmittance of the nonmagnetic support at 900 nm is preferably not more than 30%, more preferably not more than 3%.

The process for the preparation of the magnetic coating solution for the magnetic layer in the magnetic recording medium of the present invention comprises at least kneading step, dispersion step, and mixing steps which are optionally provided before or after these steps. These steps each may consist of two or more stages. The raw materials to be used in the present invention, e.g., ferromagnetic metal powder, binder resin, carbon black, abrasive, antistatic agent, lubricant and solvent, may be added to the system at the beginning or during any step. These raw materials each may be batchwise added to the system at two or more steps. For example, polyurethane may be batchwise charged in the system at the kneading step, the dispersion step and the mixing step for the viscosity adjustment after dispersion. In order to accomplish the objects of the present invention, a known preparation technique can be used as any step. In the kneading step, an apparatus having a strong kneading power, such as continuous kneader and pressure kneader, can be used to enhance the saturated magnetization Br of the magnetic recording medium of the present invention. If a continuous kneader or pressure kneader is used, the magnetic powders are kneaded with the whole or part (preferably 30% or more of the total weight of all binder resins) of the binder in an amount of 15 to 500 parts by weight based on 100 parts by weight of magnetic powders. These kneading techniques are further described in JP-A-1-106388 and JP-A-64-79274. In the preparation of the coating solution for the nonmagnetic layer, a dispersion medium having a high specific gravity is preferably used. Zirconia beads and metal beads are preferably used as the dispersion medium.

As examples of the apparatus and methods for coating to produce a magnetic recording medium having a multi-layer structure according to the present invention, the following methods can be used for example:

(1) Gravure coating method, roll coating method, blade coating method, extrusion coating method or the like, which is generally used in the application of a magnetic coating, is employed to provide a nonmagnetic layer. A magnetic layer is then applied to the magnetic layer by means of a support pressure type extrusion coating apparatus, as disclosed in JP-B-1-46186, JP-A-60-238179, and JP-A-2-265672, while the nonmagnetic layer is wet.

(2) An upper layer and a lower layer are applied substantially simultaneously by means of a coating head having two coating passage slits as disclosed in JP-A-63-88080, JP-A-2-17921, and JP-A-2-265672.

(3) An upper layer and a lower layer are applied substantially simultaneously by means of an extrusion coating apparatus with a backup roll as disclosed in JP-A-2-174965.

In order to inhibit the agglomeration of ferromagnetic powder that deteriorates the electromagnetic characteristics of the magnetic recording medium, a method as disclosed in JP-A-62-95174 and JP-A-1-236968 can be used to provide the coating solution inside the coating head with a shearing force. For the viscosity of the coating solution, the range disclosed in JP-A-3-8471 is preferably satisfied.

In order to obtain a magnetic recording medium according to the present invention, a strong orientation is generally effected. A solenoid having 1,000 G or more and a cobalt magnet having 2,000 G or more are preferably used in combination. Further, a proper drying process is preferably provided before the orientation step to maximize the orientability after drying. It is known effective to tilt the magnetizability axis, regardless of the shape of the particle, i.e., acicular or tabular, to provide high density recording. The foregoing orientation techniques may be combined with this technique.

These techniques may be also preferably combined with other known techniques for providing an adhesive layer mainly composed of a polymer before the simultaneous coating of nonmagnetic layer and magnetic layer or subjecting the nonmagnetic support to corona discharge treatment or irradiation with UV or EB to enhance the adhesiveness thereof.

The magnetic recording medium of the present invention can be subjected to a calendering treatment. Examples of a calendering roll include a roll made of a heat-resistant plastic such as epoxy, polyimide, polyamide and polyimide. A combination of metallic rolls may also be used. The treating temperature is preferably in the range of 70° to 120° C., more preferably 80° to 100° C. The linear pressure is preferably in the range of 200 to 500 kg/cm, more preferably 300 to 400 kg/cm.

The magnetic recording medium of the present invention preferably exhibits a friction coefficient of 0.1 to 0.5, more preferably 0.2 to 0.3 with respect to SUS420J on the magnetic layer side and the opposite side. The magnetic layer preferably has a specific surface resistivity of $10^4$ to $10^{12}$ Ω/sq. The magnetic layer preferably exhibits an elasticity of 100 to 2,000 kg/mm$^2$ at 0.5% elongation in both web running direction and crosswise direction. The breaking strength of the magnetic layer is preferably in the range of 1 to 30 kg/cm$^2$. The elasticity of the magnetic recording medium is preferably in the range of 100 to 1,500 kg/mm$^2$ in both web coating direction and crosswise direction. The residual elongation of the magnetic recording medium is preferably in the range of not more than 0.5%. The heat shrinkage of the magnetic recording medium at all temperatures lower than 100° C. is preferably not more than 1%, more preferably not more than 0.5%, particularly not more than 0.1%. The glass transition temperature (the maximum value of loss modulus of dynamic viscoelasticity measured at 110 Hz) of the magnetic layer is preferably from 50° to 120° C. The glass transition temperature of the nonmagnetic layer is preferably from 0° to 100° C. The loss modulus of the magnetic layer is preferably in the range of $1 \times 10^8$ to $8 \times 10^9$ dyne/cm$^2$. The loss tangent of the magnetic layer is preferably in the range of not more than 0.2. If the loss tangent of the magnetic layer is too great, it can easily suffer from faulty due to adhesion. The amount of the residual solvent to be contained in the magnetic layer is preferably in the range of not more than 100 mg/m$^2$, more preferably not more than 10 mg/m$^2$. The amount of the residual solvent in the magnetic layer is preferably less than that of the nonmagnetic layer. The nonmagnetic layer and the magnetic layer each preferably has voids of not more than 30% by volume, more preferably not more than 20% by volume. The voids are preferably small to provide a high output. In some cases, certain voids are preferably secured depending on the purpose. For example, in the case of magnetic recording media for data recording, repeated use of which is particularly needed, the voids are preferably present to provide excellent running durability.

The magnetic characteristics of the second aspect of the present invention are as defined above. On the other hand, the magnetic characteristics of the first aspect of the present invention are not specifically limited. In the magnetic characteristics of the magnetic recording medium according to the first aspect of the present invention measured under a magnetic field of 5 KOe, the coercive force Hc in the tape running direction is generally from 2,000 to 3,000 Oe, preferably from 2,100 to 2,500 Oe, and the squareness ratio is generally not less than 0.75, preferably not less than 0.80, more preferably not less than 0.85 in the tape running direction. The squareness ratio in two directions perpendicular to the tape running direction is preferably not more than 80% of that in the tape direction. SFD of the magnetic layer is preferably not more than 0.6, more preferably not more than 0.5, ideally zero.

The center line surface roughness Ra of the magnetic layer in the second aspect of the present invention is as defined above. On the other hand, the center line surface roughness Ra of the magnetic layer of the magnetic recording medium according to the first aspect of the present invention is preferably from 1 to 10 nm but should be properly adjusted depending on the purpose. The small Ra is, the better are the electromagnetic characteristics. The larger Ra is, the better is the running durability. The RMS surface roughness ($R_{RMS}$) of the magnetic layer determined by AFM evaluation is preferably from 2 to 15 nm.

The magnetic recording medium of the present invention comprises a nonmagnetic layer and a magnetic layer. The physical properties of the magnetic recording medium may be altered from the nonmagnetic layer to the magnetic layer. For example, the elasticity of the magnetic layer can be enhanced to improve the running durability thereof while the elasticity of the nonmagnetic layer can be lower than that of the magnetic layer to improve the contact of the magnetic recording medium with the head. A technique for improving head contact by changing the method for tensilizing the support is effective also in the present invention. A support which has been subjected to tensilize in the direction perpendicular to the lengthwise direction often exhibits a better head contact.

The present invention will be further described in the following examples and comparative examples, but the present invention should not be construed as being limited thereto. The term "parts" as used herein is meant to indicate "parts by weight".

EXAMPLE 1

A magnetic recording medium according to the first aspect of the present invention was prepared.

| Nonmagnetic layer (lower layer) | |
| --- | --- |
| Nonmagnetic inorganic powder ($\alpha$-Fe$_2$O$_3$; hematite) | 100 parts |
| Major axis length | 0.15 μm |
| Specific surface area by BET method | 52 m$^2$/g |
| pH | 6 |
| Tap density | 0.8 |
| DBP oil absorption | 27–38 g/100 g |
| Surface treating agents | Al$_2$O$_3$, SiO$_2$ |
| Carbon black | 20 parts |
| Average primary particle diameter | 16 nm |
| DBP oil absorption | 80 ml/100 g |
| pH | 8.0 |
| Specific surface area by BET method | 250 m$^2$/g |
| Volatile content | 1.5% |
| Vinyl chloride copolymer MR-110 (available from Nippon Zeon Co., Ltd.) | 14 parts |
| Polyester polyurethane resin Neopentyl glycol/caprolactone polyol/MDI = 0.9/2.6/1 —SO$_3$Na group contained in an amount of 1 × 10$^{-4}$ eq/g | 7.5 parts |
| $\alpha$-Al$_2$O$_3$ (average particle diameter: 0.2 μm) | 1.5 parts |
| Butyl stearate | 1.5 parts |
| Stearic acid | 1.5 parts |
| Methyl ethyl ketone | 120 parts |
| Cyclohexanone | 80 parts |
| Toluene | 50 parts |
| Magnetic layer (upper layer) | |
| Finely divided ferromagnetic powder (Composition: Fe/Co = 80/20) | 100 parts |
| Hc | 2,200 Oe |
| Specific surface area by BET method | 59 m$^2$/g |
| Crystalline size | 160 Å |
| Surface treating agent | Al$_2$O$_3$, SiO$_2$ |
| Particle size (major axis length) | 0.065 μm |
| Acicularity ratio | 7 |
| σs | 140 emu/g |
| Polyester polyurethane resin (neopentyl glycol/caprolactone polyol/MDI = 0.9/2.6/1; containing —SO$_3$Na group in an amount of 1 × 10$^{-4}$ eq/g) | 15 parts |
| $\alpha$-Alumina (average particle diameter: 0.15 μm) | 5 parts |
| Butyl stearate | 1 part |
| Stearic acid | 5 parts |
| Methyl ethyl ketone | 90 parts |
| Toluene | 60 parts |

For the foregoing two coating solutions, the respective components were kneaded by means of an open kneader, and then dispersed by means of a sand mill. To the dispersions for lower layer thus obtained were added a polyisocyanate (Colonate L, available from Nippon Polyurethane Co., Ltd.) in an amount of 7 parts. Further, to the dispersions for lower layer and upper layer was added 40 parts of a mixture of methyl ethyl ketone and cyclohexanone. These mixtures were each filtered through a filter having an average pore diameter of 1 μm to prepare the coating solutions for the nonmagnetic layer and the magnetic layer.

The coating solution for the nonmagnetic layer and the coating solution for the magnetic layer were subjected to simultaneous multi-layer coating. Specifically, the coating solution for the nonmagnetic layer was coated on a 5.5-μm thick polyethylene naphthalate support having a central surface roughness of 0.002 μm to a dry thickness of 1 μm, and the coating solution for the magnetic layer was immediately coated thereon to a dry thickness of 0.14 μm. While the two layers were wet, the coated layers were oriented under a cobalt magnet having a magnetic force of 3,000 G and a solenoid having a magnetic force of 1,500 G. After dried, the coated layers were then treated through a 7-stage calender made of metal rolls at a temperature of 90° C. at a rate of 200 m/min. The resulting magnetic recording medium was then slit into 8-mm wide strips to prepare a 8-mm video tape.

EXAMPLES 2 TO 4 AND COMPARATIVE EXAMPLES 1 TO 3

Samples were prepared in the same manner as in Example 1 except that various conditions were altered as set forth in Table 1. In Table 1, the percent content by weight of the binder in the upper layer and the lower layer are based on the weight of ferromagnetic metal powder and nonmagnetic powder, respectively.

The samples of Examples 1 to 4 and Comparative Examples 1 to 3 were then evaluated as follows:
Method for the measurement of magnetic layer:
The magnetic recording medium was cut in the longitudinal direction by a diamond cutter to a web having a width of about 0.1 μm. The section of the specimen was then observed and photographed under a transmission electron microscope at a magnification of 30,000. The print size of the photograph was A4. Thereafter, paying attention to the difference in the shape of ferromagnetic metal powder and non-magnetic powder between the magnetic layer and the non-magnetic layer, the interface of the two layers was marked black on the photograph. Similarly, the surface of the magnetic layer was marked black on the photograph. The distance between the two black marking lines was then measured by an image processor IBAS2 available from Zeiss Corp. The measurement was effected at various points along a length of 21 cm on the photograph. These measurements were then arithmetically averaged to calculate the thickness of the magnetic layer.

Specific surface area by BET method:

Quantasorb (available from US Quantachrome) was used. The specimen was dehydrated at a temperature of 250° C. in an atmosphere of nitrogen for 30 minutes, and then measured for specific surface area by BET single-point method (partial pressure: 0.30).

Magnetic properties Hc, Br, Bm:

These properties were measured at an external magnetic field Hm of 10 kOe by means of an oscillating specimen type magnetic flux meter (available from Toei Kogyo K. K.).

Center line average surface roughness Ra:

The surface of the magnetic recording medium was measured for Ra on the area of about 250 nm×250 nm by MIRAU method using TOPO3D available from WYKO. The measurement wavelength was about 650 nm. Spherical surface correction and cylindrical correction were made on the measurements. The apparatus used in this measurement method was a non-contact surface roughness meter utilizing interference of light.

Particle diameter of ferromagnetic metal powder and non-magnetic inorganic powder:

The sample was photographed under a transmission electron microscope. The major axis diameter and minor axis diameter of the ferromagnetic metal powder were directly measured on the photograph. Alternatively, the photograph was traced by an image analyzer IBASS1 available from Carlzeis Corp. to determine the major axis diameter and minor axis diameter of the powder. The two methods were properly used in combination to determine the average particle diameter.

N/Fe ratio:

An X-ray photoelectron spectrometer (available from PERKIN-ELMER) was used. As an X-ray source, an Mg anode was used. The measurement was effected at 300 W. In the measurement, the lubricant was washed away with n-hexane from the tape. The tape was then set in the X-ray photoelectron spectrometer. The distance between the X-ray source and the sample was 1 cm. The measurement system was then evacuated. After 5 minutes, N-1s spectrum and Fe-2p (3/2) spectrum of the sample were integrated for 10 minutes for measurement. The pass energy was kept to 100 eV. The integrated intensity ratio to N-1s spectrum measured was then calculated to determine the amount of nitrogen on the surface of the sample.

Crystalline size of ferromagnetic metal powder:

The crystalline size of the sample was determined from the difference in the half value width of diffraction line of (1,1,0) plane and (2,2,0) plane by X-ray diffractiometry.

The electromagnetic characteristics were measured in the following manner:

20.9 MHz output:

A trial ME tape prepared by Fuji Photo Film Co., Ltd. was used as a reference. The output at 20.9 MHz (recording wavelength: 0.488 $\mu$m) was measured at a relative speed of 10.2 m/sec by means of an external contact type drum tester. The head used was a head mainly composed of Fe having Bs (saturated magnetization) of 1.5 T (Tesla). The measurements were obtained when recording and reproduction were effected at the optimum recording current as defined later. The higher the output at recording wavelength of 0.488 $\mu$m is, the better is the result.

C/N ratio:

A 20.9 MHz (recording wavelength: 0.488 $\mu$m) was recorded and reproduced by the foregoing external contact type drum tester. The reproduced signal was then measured for modification noise by means of a spectrum analyzer. The ratio of noise at the frequency 1 MHz lower than the carrier signal (19.9 MHz) to the output of 20.9 MHz signal is defined as CNR. The higher CNR is, the better is the result.

Head contact compatibility of MP tape with ME tape:

The head contact compatibility of MP with Me is represented by the envelope flatness of MP and ME determined as follows:

Envelope flatness of MP tape:

A Hi-8 video deck EV-S900 produced by Sony Corp. was used. The head of the video deck was lapped with a cleaning tape available from Fuji Photo Film Co., Ltd. A reference ME produced by Fuji Photo Film Co., Ltd. was then allowed to run on the head. A 20.9 MHz output was then recorded on and reproduced from MP. The difference between the highest output and the lowest output in one envelope was then determined. When the difference is not more than 1 dB, there is no problem.

Envelope flatness of ME tape:

A Hi-8 video deck EV-S900 produced by Sony Corp. was used. The head of the video deck was lapped with a cleaning tape available from Fuji Photo Film Co., Ltd. A MP test sample was then allowed to run on the head. A 20.9 MHz output was then recorded on and reproduced from the reference ME produced by Fuji Photo Film Co., Ltd. The difference between the highest output and the lowest output in one envelope was then determined. When the difference is not more than 1 dB, there is no problem.

Still durability:

Using EV-S900 available from Sony Corp., the longest allowable period during which reproduction can be made in still condition at a temperature of 5° C. and 80% RH was measured up to 1 hour. This is represented by the time required until the output is reduced by 6 dB from the initial value.

The results are set forth in Table 1.

TABLE 1

| Sample No. | Example 1 | Example 2 | Example 3 | Comparative Example 1 | Comparative Example 2 | Example 4 | Comparative Example 3 |
|---|---|---|---|---|---|---|---|
| Thickness of magnetic layer ($\mu$m) | 0.14 | 0.08 | 0.20 | 0.05 | 0.21 | 0.08 | 0.2 |

TABLE 1-continued

| Sample No. | Example 1 | Example 2 | Example 3 | Comparative Example 1 | Comparative Example 2 | Example 4 | Comparative Example 3 |
|---|---|---|---|---|---|---|---|
| Upper layer binder (% by weight) | | | | | | | |
| Vinyl chloride copolymer | 0 | 0 | 0 | 0 | 0 | 0 | 0 |
| Polyurethane resin | 15 | 15 | 15 | 15 | 15 | 15 | 15 |
| Colonate L (Hw1) | 0 | 0 | 0 | 0 | 0 | 7 | 0 |
| Lower layer binder (% by weight) | | | | | | | |
| Vinyl chloride copolymer | 14 | 14 | 14 | 14 | 14 | 14 | 14 |
| Polyurethane resin | 7.5 | 7.5 | 7.5 | 7.5 | 7.5 | 7.5 | 7.5 |
| Colonate L (Hw2) | 7 | 7 | 7 | 7 | 7 | 7 | 7 |
| ΔH = Hw2 − Hw1 | 7 | 7 | 7 | 7 | 7 | 2 | 0 |
| Bm of magnetic layer (G) | 5,500 | 5,800 | 5,100 | 6,100 | 4,500 | 5,500 | 3,650 |
| N/Fe | 0.036 | 0.045 | 0.033 | 0.055 | 0.015 | 0.075 | 0.10 |
| Output (dB) | +2.5 | +1.2 | +3.0 | −1.5 | +2.5 | +1.3 | +1.0 |
| C/N ratio (dB) | +2.2 | +1.5 | +2.1 | −2.2 | +2.2 | +1.5 | +0.9 |
| MP envelope flatness (dB) | −0.2 | −0.6 | −0.3 | −0.8 | −0.7 | −0.8 | −1.8 |
| ME envelope flatness (dB) | −0.1 | −0.8 | −0.5 | −1.1 | −0.5 | −0.9 | −1.5 |
| Still durability (min) | 60 | 60 | 60 | 60 | 15 | 60 | 60 |

EXAMPLE 5

A magnetic recording medium according to the second aspect of the present invention was prepared.

| Nonmagnetic layer (lower layer) | |
|---|---|
| Nonmagnetic inorganic powder (α-Fe$_2$O$_3$; hematite) | 80 parts |
| Major axis length | 0.15 μm |
| Specific surface area by BET method | 52 m$^2$/g |
| pH | 6 |
| Tap density | 0.8 |
| DBP oil absorption | 27–38 g/100 g |
| Surface treating agent | Al$_2$O$_3$, SiO$_2$ |
| Carbon black | 20 parts |
| Average primary particle diameter | 16 nm |
| DBP oil absorption | 80 ml/100 g |
| pH | 8.0 |
| Specific surface area by BET method | 250 m$^2$/g |
| Volatile content | 1.5% |
| Vinyl chloride copolymer MR-110 (available from Nippon Zeon Co., Ltd.) | 12 parts |
| Polyester polyurethane resin Neopentyl glycol/caprolactone polyol/MDI = 0.9/2.6/1 —SO$_3$Na group contained in an amount of 1 × 10$^{-4}$ eq/g | 5 parts |
| α-Al$_2$O$_3$ (average particle diameter: 0.2 μm) | 1 part |
| Butyl stearate | 1 part |
| Stearic acid | 1 part |
| Methyl ethyl ketone | 100 parts |
| Cyclohexanone | 50 parts |
| Toluene | 50 parts |
| Magnetic layer (upper layer) | |
| Finely divided ferromagnetic powder (composition: Fe/Co = 80/20) | 100 parts |
| Hc | 2,200 Oe |
| Specific surface area by BET method | 59 m$^2$/g |
| Crystalline size | 170 Å |
| Surface treating agent | Al$_2$O$_3$, SiO$_2$ |
| Particle size (major axis length) | 0.08 μm |
| Acicularity ratio | 8 |
| σs | 137 emu/g |
| Polyester polyurethane resin (neopentyl glycol/caprolactone polyol/MDI = 0.9/2.6/1; containing —SO$_3$Na group in an amount of 1 × 10$^{-4}$ eq/g) | 12 parts |
| α-Alumina (average particle diameter: 0.15 μm) | 5 parts |
| Butyl stearate | 1 part |
| Stearic acid | 5 parts |
| Methyl ethyl ketone | 90 parts |
| Cyclohexanone | 30 parts |
| Toluene | 60 parts |

For the foregoing two coating solutions, the respective components were kneaded by means of an open kneader, and then dispersed by means of a sand mill. To the dispersions for lower layer thus obtained were added a polyisocyanate (Colonate L, available from Nippon Polyurethane Co., Ltd.) in an amount of 5 parts. Further, to the dispersions for lower layer and upper layer was added 40 parts of a mixture of methyl ethyl ketone and cyclohexanone. These mixtures were each filtered through a filter having an average pore diameter of 1 μm to prepare the coating solutions for the nonmagnetic layer and the magnetic layer.

The coating solution for the nonmagnetic layer and the coating solution for the magnetic layer were subjected to simultaneous multi-layer coating. Specifically, the coating solution for the nonmagnetic layer was coated on a 5.5-μm thick polyethylene naphthalate support having a central surface roughness of 0.002 μm to a dry thickness of 1 μm, and the coating solution for the magnetic layer was immediately coated thereon to a dry thickness of 0.12 μm. While the two layers were wet, the coated layers were oriented under a cobalt magnet having a magnetic force of 3,000 G and a solenoid having a magnetic force of 1,500 G. After dried, the coated layers were then treated through a 7-stage calender made of only metal rolls at a temperature of 90° C. at a rate of 200 m/min. The resulting magnetic recording medium was then slit into 8-mm wide strips to prepare a 8-mm video tape.

EXAMPLES 6 TO 11 AND COMPARATIVE EXAMPLES 4 TO 9

Samples were prepared in the same manner as in Example 5 except that the various conditions were altered as follows:

In Example 6, the thickness of the magnetic layer of Example 5 was reduced to the lower limit, i.e., 0.07 µm.

In Example 7, the thickness of the magnetic layer of Example 5 was raised to the upper limit, i.e., 0.20 µm.

In Comparative Example 4, the thickness of the magnetic layer of Example 6 was further reduced to 0.06 µm.

In Comparative Example 5, the thickness of the magnetic layer of Example 7 was further raised to 0.22 µm.

In Example 8, the amount of the polyester polyurethane resin to be contained in the magnetic layer of Example 5 was raised to 16 parts by weight to lower Bm.

In Example 9, the ferromagnetic metal powder to be used in Example 5 was changed to the following composition, and the amount of the polyester polyurethane was reduced to 9 parts by weight.

| Finely divided ferromagnetic powder (composition: Fe/Co = 70/30) | |
|---|---|
| Hc | 2,500 Oe |
| Specific surface area by BET method | 62 m²/g |
| Crystalline size | 190 Å |
| Surface treating agent | Al₂O₃, SiO₂, Y |
| Particle size (major axis length) | 0.11 µm |
| Acicularity ratio | 10 |
| σs | 160 emu/g |

In Comparative Example 6, the amount of the polyester polyurethane to be used in Example 5 was increased from 12 parts by weight to 24.5 parts by weight to lower Bm.

In Comparative Example 7, the amount of the polyester polyurethane to be used in Example 9 was reduced to 7.5 parts by weight.

In Example 10, the ferromagnetic metal powder to be used in Example 5 was changed to the following composition.

| Finely divided ferromagnetic powder (composition: Fe/Co = 90/10) | |
|---|---|
| Hc | 1,960 Oe |
| Specific surface area by BET method | 58 m²/g |
| Crystalline size | 170 Å |
| Surface treating agent | Al₂O₃, SiO₂, Y |
| Particle size (major axis length) | 0.08 µm |
| Acicularity ratio | 8 |
| σs | 134 emu/g |

In Example 11, the ferromagnetic metal powder to be used in Example 5 was changed to the following composition.

| Finely divided ferromagnetic powder (composition: Fe/Co = 70/30) | |
|---|---|
| Hc | 2,800 Oe |
| Specific surface area by BET method | 65 m²/g |
| Crystalline size | 130 Å |
| Surface treating agent | Al₂O₃, SiO₂, Y |
| Particle size (major axis length) | 0.08 µm |
| Acicularity ratio | 12 |
| σs | 130 emu/g |

In Comparative Example 8, the ferromagnetic metal powder to be used in Example 5 was changed to the following composition.

| Finely divided ferromagnetic powder (composition: Fe/Co = 90/10) | |
|---|---|
| Hc | 1,850 Oe |
| Specific surface area by BET method | 57 m²/g |
| Crystalline size | 170 Å |
| Surface treating agent | Al₂O₃, SiO₂, La |
| Particle size (major axis length) | 0.11 µm |
| Acicularity ratio | 10 |
| σs | 137 emu/g |

In Comparative Example 9, the ferromagnetic metal powder to be used in Example 5 was changed to the following composition.

| Finely divided ferromagnetic powder (composition: Fe/Co = 70/30) | |
|---|---|
| Hc | 2,900 Oe |
| Specific surface area by BET method | 54 m²/g |
| Crystalline size | 160 Å |
| Surface treating agent | Al₂O₃, SiO₂, La |
| Particle size (major axis length) | 0.13 µm |
| Acicularity ratio | 15 |
| σs | 134 emu/g |

The samples of Examples 5 to 11 and Comparative Examples 4 to 9 were evaluated in the same manner as in Examples 1 to 4. Electromagnetic characteristics other than the above characteristics were measured by the following methods.

Output at recording wavelengths of 0.488 µm and 22 µm:

As a reference there was used a ME tape prepared on an experimental basis. The output at these recording wavelengths were measured at a relative speed of 10.2 m/sec by means of an external contact type drum tester. The head used was a head mainly composed of Fe having Bs (saturated magnetization) of 1.5 T (Tesla). The measurements were obtained when recording and reproduction were effected at the optimum recording current as defined later.

The higher the output at a recording wavelength of 0.488 µm is, the better is the result. The output at a recording wavelength of 22 µm is preferably in the range of from −2 dB to +2 dB.

Overwriting erasability:

Using an external contact type drum tester, a rectangular signal was recorded at a recording wavelength of 22 µm. The signal thus recorded was then reproduced and measured. A rectangular signal having a recording wavelength of 0.488 µm was then superimposed on the rectangular signal thus recorded. The superimposed signal was then reproduced. The output having a recording wavelength of 22 µm was read out by means of a spectrum analyzer. The ratio of the superimposed signal thus read out at a wavelength of 22 µm to the signal reproduced before superimposing is defined as overwriting erasability. It is preferably not more than −20 dB as an absolute value.

Input/output characteristics:

Using the foregoing external contact drum tester, a rectangular signal having a recording wavelength of 0.488 µm was recorded at different recording currents, and then reproduced.

Optimum recording current:

Recording current +4 dB larger than recording current at which 90% of the maximum reproduced output on the input/output characteristics curve can be obtained. It is preferably in the range of ±1.0 dB from the reference value.

The results are set forth in Table 2.

In Example 12, a sample was prepared in the same manner as in Example 12 except that the amount of the filler to be incorporated in the nonmagnetic support was increased by about 30%.

In Example 13, a sample was prepared in the same manner as in Example 5 except that the particle diameter and

TABLE 2

| Sample No. | Example 5 | Example 6 | Example 7 | Comparative Example 4 | Comparative Example 5 | Example 8 | Example 9 |
|---|---|---|---|---|---|---|---|
| Thickness of magnetic layer ($\mu$m) | 0.12 | 0.07 | 0.20 | 0.06 | 0.22 | 0.12 | 0.12 |
| Bm (G) | 4,500 | 4,500 | 4,500 | 4,500 | 4,500 | 3,700 | 6,000 |
| Hc (Oe) | 2,300 | 2,300 | 2,300 | 2,300 | 2,300 | 2,300 | 2,300 |
| Ra of magnetic layer (nm) | 1.9 | 1.2 | 2.7 | 1.9 | 2.0 | 1.8 | 2.0 |
| Output at recording wavelength of 0.488 $\mu$m | 2.0 | 1.2 | 2.2 | 0.1 | 2.0 | 1.5 | 3.2 |
| Output at recording wavelength of 22 $\mu$m | 0.2 | -2.0 | 1.3 | -3.6 | 2.0 | -1.9 | 2.0 |
| Overwriting erasability | -22 | -25.3 | -19.8 | -26.1 | -16.3 | -22.1 | -21.5 |
| Optimum recording current (dB) | 0.2 | 0.5 | ±0 | 0.5 | -0.1 | 0.6 | 0.5 |

| Sample No. | Comparative Example 6 | Comparative Example 7 | Example 10 | Example 11 | Comparative Example 8 | Comparative Example 9 |
|---|---|---|---|---|---|---|
| Thickness of magnetic layer ($\mu$m) | 0.12 | 0.12 | 0.12 | 0.12 | 0.12 | 0.12 |
| Bm (G) | 3,500 | 6,300 | 4,500 | 4,500 | 4,500 | 4,500 |
| Hc (Oe) | 2,300 | 2,300 | 2,020 | 3,000 | 1,950 | 3,300 |
| Ra of magnetic layer (nm) | 1.2 | 2.9 | 1.7 | 1.6 | 2.1 | 2.5 |
| Output at recording wavelength of 0.488 $\mu$m | 1.4 | 0.1 | 2.2 | 3.1 | -1.4 | 0.5 |
| Output at recording wavelength of 22 $\mu$m | -2.5 | 2.1 | 0.1 | 0.4 | 0.2 | -0.2 |
| Overwriting erasability | -21.8 | -10.2 | -22.8 | -20.6 | -22.5 | -15.3 |
| Optimum recording current (dB) | 0.5 | -1.2 | -0.5 | 1.0 | -0.4 | 1.5 |

EXAMPLES 12 TO 15 AND COMPARATIVE EXAMPLES 10 TO 13

Samples were prepared in the same manner as in Example 5 except that the various conditions were altered.

In Comparative Example 10, calendering was effected at a temperature of 50° C. by a calender made of a plastic roll and a metallic roll to provide the magnetic layer with a raised surface roughness.

In Comparative Example 11, a sample was prepared in the same manner as in Example 5 except that the calendering treatment conducted in Example 5 was repeated 5 times to further reduce the surface roughness of the magnetic layer.

In Comparative Example 12, a sample was prepared in the same manner as in Example 5 except that the particle diameter of the filler to be incorporated in the nonmagnetic support was about twice that of Example 5 and the amount of the filler was increased by 1.5 times to raise the surface roughness of the support.

amount of the filler to be incorporated in the nonmagnetic support was halved to provide the base with a smooth surface.

In Comparative Example 13, a sample was prepared in the same manner as in Example 5 except that the particle diameter of the filler to be incorporated in the nonmagnetic support was halved and the amount of the filler to be incorporated in the nonmagnetic support was reduced to one tenth of Example 5 to further reduce the surface roughness of the nonmagnetic support.

In Example 14, a sample was prepared in the same manner as in Example 5 except that the thickness of the nonmagnetic support was increased from 5.5 $\mu$m to 6.9 $\mu$m.

In Example 15, a sample was prepared in the same manner as in Example 5 except that the thickness of the nonmagnetic support was reduced from 5.5 $\mu$m to 2.9 $\mu$m.

The results are set forth in Table 3.

TABLE 3

| Sample No. | Example 5 | Comparative Example 10 | Comparative Example 11 | Example 12 |
|---|---|---|---|---|
| Thickness of magnetic layer ($\mu$m) | 0.12 | 0.12 | 0.12 | 0.12 |
| Bm (G) | 4,500 | 4,500 | 4,500 | 4,500 |
| Hc (Oe) | 2,300 | 2,300 | 2,300 | 2,300 |

TABLE 3-continued

|  | | | | |
|---|---|---|---|---|
| Ra of magnetic layer (nm) | 1.9 | 3.2 | 0.9 | 2.8 |
| Ra of nonmagnetic support (nm) | 2.0 | 2.0 | 2.0 | 6.5 |
| Total thickness of magnetic recording medium (μm) | 7.1 | 7.1 | 7.1 | 7.1 |
| Output at recording wavelength of 0.488 μm | 2.0 | −1.5 | —*1 | 1.2 |
| Output at recording wavelength of 22 μm | 0.2 | −1.0 | —*1 | 0.1 |
| Overwriting erasability | −22 | −19 | —*1 | −20.5 |
| Optimum recording current (dB) | 0.2 | 0.1 | —*1 | 0.2 |

| Sample No. | Comparative Example 12 | Example 13 | Comparative Example 13 | Example 14 | Example 15 |
|---|---|---|---|---|---|
| Thickness of magnetic layer (μm) | 0.12 | 0.12 | 0.12 | 0.12 | 0.12 |
| Bm (G) | 4,500 | 4,500 | 4,500 | 4,500 | 4,500 |
| Hc (Oe) | 2,300 | 2,300 | 2,300 | 2,300 | 2,300 |
| Ra of magnetic layer (nm) | 2.9 | 1.1 | 1.1 | 1.9 | 1.9 |
| Ra of nonmagnetic support (nm) | 7.3 | 0.6 | 0.4 | 2.0 | 2.0 |
| Total thickness of magnetic recording medium (μm) | 7.1 | 7.1 | 7.1 | 8.5 | 4.5 |
| Output at recording wavelength of 0.488 μm | −0.5 | 2.8 | —*2 | 1.5 | 1.5 |
| Output at recording wavelength of 22 μm | −1 | 0.3 | —*2 | 0.3 | 0.1 |
| Overwriting erasability | −19 | −25 | —*2 | −20 | −21 |
| Optimum recording current (dB) | 0.0 | 0.4 | —*2 | 0.1 | 0 |

Note:
*1 In Comparative Example 11, a sample could not run and was unmeasurable.
*2 In Comparative Example 13, a sample could not be made.

While the invention has been described in detail and with reference to specific embodiments thereof, it will be apparent to one skilled in the art that various changes and modifications can be made therein without departing from the spirit and scope thereof.

What is claimed is:

1. A magnetic recording medium prepared by a process which comprises providing a nonmagnetic layer by coating a nonmagnetic support with a coating solution comprising a nonmagnetic powder, polyisocyanate and a binder, and then providing a magnetic layer by coating said nonmagnetic layer while said nonmagnetic layer is wet with a coating solution comprising Fe containing ferromagnetic metal powder and a binder comprising a polyurethane resin curable by said polyisocyanate, wherein the dry thickness of said magnetic layer is from 0.07 to 0.20 μm, the ratio of N/Fe in said magnetic layer is from 0.010 to 0.090 as determined by an X-ray photoelectric spectrophotometer, wherein polyisocyanate is optionally present in the coating solution of the magnetic layer and wherein the percent proportion by weight (Hw2) of said polyisocyanate contained in said coating solution of said nonmagnetic layer to said nonmagnetic powder contained in said coating solution, and the percent proportion by weight (Hw1) of polyisocyanate contained in said coating solution of said magnetic layer to said ferromagnetic metal powder contained in said coating solution have the following relationships:

(Hw2)≧2% by weight;

(Hw1)≧0% by weight; and

2% by weight≦(Hw2)−(Hw1)≦20% by weight.

2. A magnetic recording medium as claimed in claim 1, wherein the coating solution of said magnetic layer is free of polyisocyanate.

3. A magnetic recording medium as claimed in claim 1, wherein said binder contained in said nonmagnetic layer comprises at least a vinyl chloride copolymer and a polyisocyanate.

4. A magnetic recording medium as claimed in claim 3, wherein the content of said polyurethane resin in said binder contained in said magnetic layer adjacent to said nonmagnetic layer is greater than that of other resins in said binder, and the content of said vinyl chloride copolymer in said binder contained in said nonmagnetic layer is greater than that of other resins in said binder.

5. A magnetic recording medium as claimed in claim 1, wherein said magnetic layer exhibits a maximum magnetic flux density Bm of from 3,800 to 6,000 G.

6. A magnetic recording medium as claimed in claim 1, wherein the thickness of said magnetic layer is 0.08 to 0.15 μm.

7. A magnetic recording medium as claimed in claim 1, wherein (Hw2−Hw1) is from 2 to 15% by weight.

8. A magnetic recording medium as claimed in claim 7, wherein the thickness of said magnetic layer is 0.09 to 0.14 μm.

9. A magnetic recording medium as claimed in claim 8, wherein (Hw2−Hw1) is from 3 to 10% by weight.

10. A magnetic recording medium comprising a nonmagnetic support having thereon a lower nonmagnetic layer comprising a nonmagnetic powder and a binder, and further thereon a magnetic layer comprising at least a ferromagnetic metal powder and a binder, wherein said magnetic layer has a thickness of from 0.07 to 0.20 μm, said magnetic layer has a maximum magnetic flux density Bm of from 3,700 to 6,000 G as measured in an external magnetic field of 10 kOe, said magnetic layer has a coercive force Hc of from 2,000 to 3,000 Oe, said magnetic layer has a center line surface roughness Ra of from 1.0 to 3.0 nm, and said nonmagnetic support has a center line surface roughness of from 0.5 to 7.0 nm on the side thereof to which said lower nonmagnetic layer is provided.

11. A magnetic recording medium as claimed in claim 10, said magnetic recording medium has a total thickness of from 4.5 to 8.5 $\mu$m.

12. A magnetic recording medium as claimed in claim 10, wherein said magnetic layer is provided by a coating solution, which is free of polyisocyanate.

* * * * *